(12) United States Patent
Schlanger

(10) Patent No.: US 6,520,595 B1
(45) Date of Patent: Feb. 18, 2003

(54) VEHICLE WHEEL

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 0 days.

(21) Appl. No.: 09/210,973

(22) Filed: Dec. 14, 1998

(51) Int. Cl.[7] .......................... B60B 1/02; B60B 21/06; B60B 27/00
(52) U.S. Cl. .......................... 301/59; 301/55; 301/57; 301/110.5
(58) Field of Search .......................... 301/64.7, 55, 57, 301/59 I, 104, 110.5, 65, 74, 80, 61, 73, 79, 75, 81; 29/894.33, 894.343

(56) References Cited

U.S. PATENT DOCUMENTS

| | | | |
|---|---|---|---|
| 23,695 A | * 4/1859 | Murphy | 301/80 |
| 168,210 A | * 9/1875 | Ball | 301/65 |
| 358,531 A | * 3/1887 | Behringer | 301/55 |
| 396,991 A | * 1/1889 | Donmoyer | 301/57 |
| 406,705 A | * 7/1889 | Crecelius | 301/59 |
| 420,075 A | * 1/1890 | Kennelly | 301/79 |
| 463,897 A | * 11/1891 | Hare | 301/65 |
| 528,887 A | * 11/1894 | Myers | 301/59 |
| 636,274 A | * 11/1899 | Morse | 301/55 |
| 680,633 A | * 8/1901 | Arnold | 301/57 |
| 719,744 A | * 2/1903 | Cannon | 301/65 |
| 779,877 A | * 1/1905 | Schofield | 301/57 |
| 865,274 A | * 9/1907 | Smith et al. | 301/7 |
| 901,568 A | * 10/1908 | Verplanck | 301/81 |
| 1,022,648 A | * 4/1912 | Wickham | 301/57 |
| 1,095,298 A | * 5/1914 | Thorspeck | 301/57 |
| 1,373,707 A | * 4/1921 | Bennett | 301/59 |
| 1,421,128 A | 6/1922 | Clark | |
| 1,464,566 A | * 8/1923 | Ford | 301/57 |
| 1,492,850 A | * 5/1924 | Hubbard | 301/57 |
| 3,199,922 A | * 8/1965 | Krenz | 301/59 |
| 3,251,978 A | * 5/1966 | Smith | 301/74 |
| 3,695,729 A | 10/1972 | Schwerdhofer | |
| 4,588,542 A | * 5/1986 | Pierce | 301/64.7 |
| 4,595,242 A | * 6/1986 | Wehmeyer | 301/110.5 |
| 4,681,647 A | * 7/1987 | Kondo et al. | 301/64.7 |
| 4,729,605 A | 3/1988 | Imao et al. | |
| 5,064,250 A | 11/1991 | Yashiro et al. | |
| 5,110,190 A | 5/1992 | Johnson | |
| 5,429,421 A | * 7/1995 | Watson | 301/59 |
| 5,626,401 A | * 5/1997 | Terry, Sr. et al. | 301/59 |
| 5,829,844 A | * 11/1998 | Slankard et al. | 301/110.5 |

FOREIGN PATENT DOCUMENTS

| | | | | |
|---|---|---|---|---|
| DE | 0073408 | * | 3/1983 | 301/64.7 |
| GB | 231748 | * | 4/1925 | 301/104 |
| GB | 443877 | * | 3/1936 | 301/57 |

* cited by examiner

*Primary Examiner*—S. Joseph Morano
*Assistant Examiner*—Jason R. Bellinger
(74) *Attorney, Agent, or Firm*—Bachman & LaPointe, P.C.

(57) ABSTRACT

Improved vehicle wheel construction with a peripheral rim, a central wheel hub and a plurality of spokes extending between the rim and hub, wherein the spokes have a first peripheral portion connected to the rim and a second central portion opposed to the first portion. The hub includes at least two opposed outer flanges, with the central portions of the spokes secured to at least one of the outer flanges by hardened molding material.

88 Claims, 15 Drawing Sheets

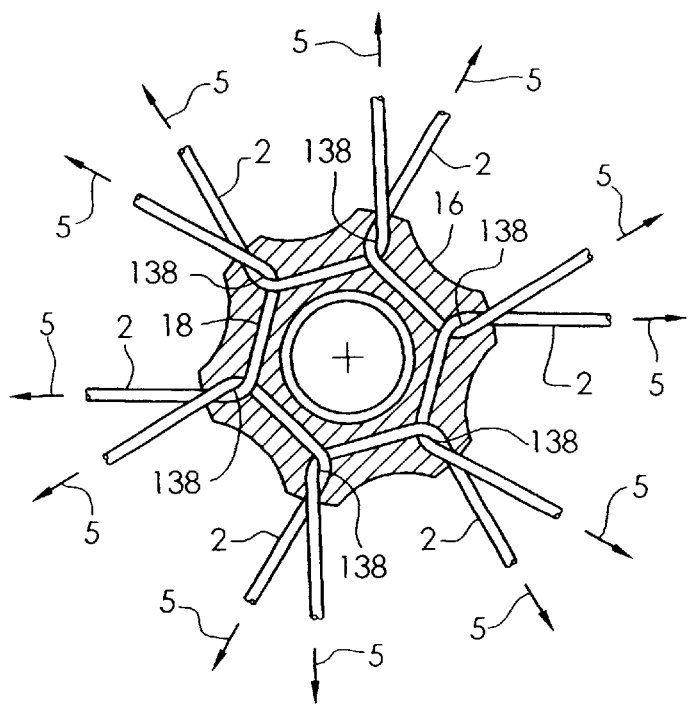
FIG. 8a
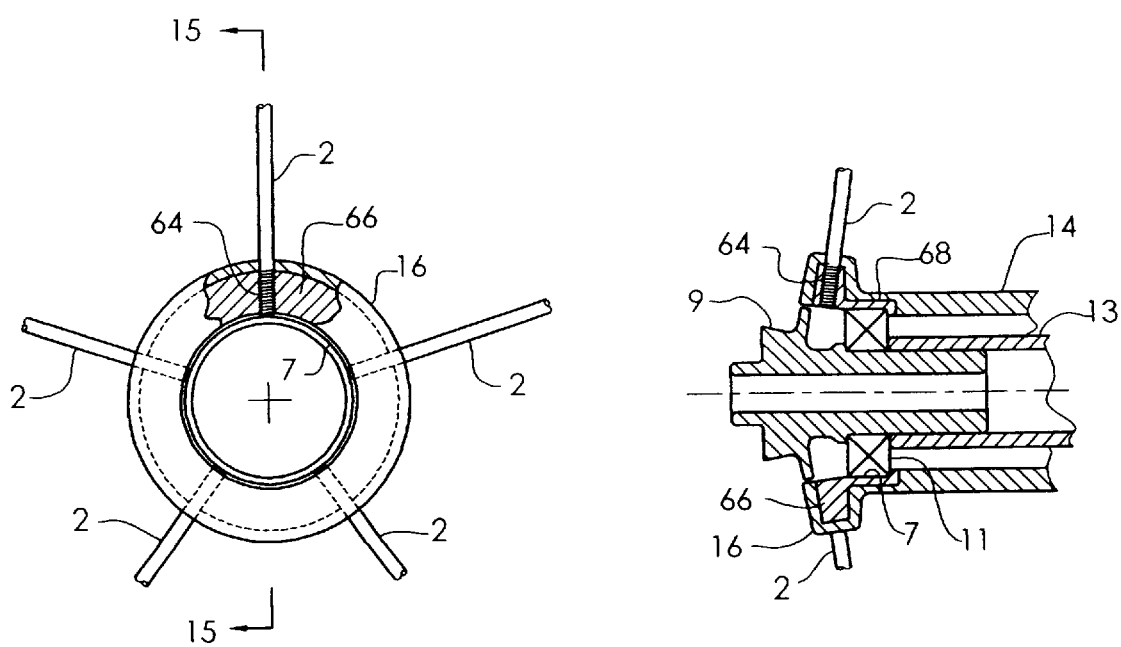
FIG. 8b
FIG. 8c

VEHICLE WHEEL

BACKGROUND OF THE INVENTION

The present invention relates to an improved vehicle wheel construction, particularly bicycle wheels, including an improved connection means for connecting the spokes to the hub.

Heretofore, the vast majority of bicycle wheels have been constructed using steel wire spokes that are connected, at their inner end, to a central hub component and, at their outer end, to a metallic rim hoop. The spokes are generally of steel construction while the hub and rim may be of aluminum or steel construction. The spokes, hub and rim are each formed as separate components that are then joined together with mechanical connections.

To facilitate the assembly of this bicycle wheel, a certain level of automation has been applied to many of the operations. However, several of the operations still require manual labor, such as the tedious process of threading the individual spokes through the hub, a process commonly referred to as "stuffing" the hub. After the hub is "stuffed" with spokes, the spokes are manually adjusted to align the outer end of the spoke with its corresponding hole in the rim in a process called "lacing". The "stuffing" and "lacing" operations have never been automated and are commonly tedious and time consuming tasks which require a relatively high level of skill on the part of the operator.

The manufacture of the hub component is also an expensive process. Some hub shells are machined from billet while others are cast or forged and subsequently machined. This machining operation generally requires at least three machining setups. First the cylindrical portions of the hub are turned on lathe, second, the spoke holes in one hub flange are drilled in a rotary index operation, and third, the opposite hub flange is drilled in a separate rotary index operation as well. This multi-step machining process adds considerable expense to the manufacture of the hub shell component.

The tensile forces within the spoke create high stresses at their connection points and the connection between the spoke and the hub flange must therefore be capable of withstanding these stresses. In the current spoke connection arrangement, stresses due to spoke tension are concentrated within a relatively small region of the hub flange, namely the portion of the hub flange material that is radially outward from the spoke hole. This requires that the hub flange construction be based on expensive, higher strength materials and the use of more expensive forming processes such as forging, rather than less costly processes such as die casting or injection molding. Further, these stresses require that the flange be designed with robust thickness, thus adding weight to the wheel assembly.

The spokes of most conventional wheels are constructed of steel wire with a sharp "J" bend close to the headed end and adjacent to the point where they pass through the hole in the flange. The "J" bend region of the spoke is considerably weaker and less ductile due to the overstress of the material to achieve this bend. As would be expected, the "J" bend region is a common breakage point for spokes of the current design. Spoke manufacturers have attempted to compensate for this shortcoming by thickening the wire in this region, but this solution results in considerable extra expense and weight.

It is often an objective to construct wheels with spokes that are flattened along their length to create a more aerodynamic cross-section profile. With a conventional hub flange, this creates a problem where the extra wide spoke cross section must pass through the round hole in the hub flange. The common assembly method, when flattened spokes are utilized, requires the slotting or notching of each individual spoke hole in the two hub flanges to allow the spoke to pass through. This additional operation adds considerable expense and weakens the hub flange as well.

In recent years, some attempt has been made to improve on this conventional wheel design, but the changes have been minor and still retain the same materials and basic configuration. Interestingly, many of these more modern designs are simply a rehash of inventions that are more than 80 years old. This is likely due to the fact that, aside from some more esoteric examples, these modern wheels rely on similar materials and construction techniques as those employed 80 years ago.

Several recent hub designs have recently been introduced which permit a "straight pull" spoke arrangement where the hub flange includes spoke holes which are in a generally radial direction, thus eliminating the requirement for a "J" bend in the spoke. However, since the spoke hole of this new design is in line with the spoke, the spoke has no resistance to spinning within its hole. This can create great difficulty when assembling the wheel, since the opposite end of the spoke includes a threaded connection that requires that the spoke to be fixed in order to facilitate the threaded adjustment. Further, this "straight pull" design does not solve any of the other shortcomings outlined above.

In the past 30 years, there have been significant technological developments in the area of synthetic fibers. Many of these materials have exceptionally high specific tensile properties that are ideally suited for use as the spoke component of the wheel. However, it has proven difficult to adapt these materials to wheel components of a conventional design. The mechanical connections, dictated by current wheel assembly designs, do not allow the present design to take full advantage of these new materials. While some attempts have been made to adapt these materials for use as a spoke, the designs often rely on additional fittings and connections to facilitate their use in wheels of relatively conventional design. A good example of such a design is illustrated in U.S. Pat. No. 4,729,605. These extra fittings add cost and weight to these spokes while the additional connections may compromise the strength of the spoke, thus reducing the potential benefit of these new materials.

Accordingly, it is a principal objective of the present invention to provide a new and improved vehicle wheel construction.

It is a further objective of the present invention to provide a construction as aforesaid which reduces costs and provides a wheel that is light in weight and high in strength and reliability.

Further objects and advantages of the present invention will appear hereinbelow.

SUMMARY OF THE INVENTION

In accordance with the present invention, it has now been found that the foregoing objects and advantages may be readily obtained.

The wheel of the present invention comprises: a peripheral wheel rim; a central wheel hub with an outer flange; a plurality of spokes extending between the rim and hub, wherein said spokes have a first outer peripheral portion connected to said rim and a second inner portion opposed to said first portion; with at least one of the first portion and the second portion of at least one spoke secured to at least one of said rim and hub by hardened molding material which is integral or solid connected with the rim and hub, respectively and preferably adhered or bonded thereto, and wherein the hardened molding material has a surface conforming to a surface of the rim and hub, respectively. The second portions of the spokes are desirably secured to said outer flange and desirably are encapsulated in said hardened molding material. Preferably, a plurality of spokes are so secured and desirably there is a joining interface between the spokes and hardened molding material. The hardened molding material will preferably form at least a portion of a flange. The hardened molding material encapsulates the spoke or spokes and preferably surrounds the entire cross-section thereof.

The present invention obtains many advantages. An integral firm connection is obtained and not simply a mechanical connection. It is an advantage of the present invention that costs are reduced by reducing the assembly labor required to build a wheel. During manufacture, the spokes of the present invention need only to be placed in the intended location prior to the hub flange being formed or molded around them. This eliminates the inherently manual operation of threading each individual spoke through its mating hole in the hub flange and greatly simplifies the operation of "stuffing" the hub and greatly reduces the amount of labor required for this operation. Further, due the simplicity of this manufacturing operation, the opportunity exists to utilize factory automation techniques and/or robotics to perform this operation, thus further reducing manufacturing costs.

After the hub flange material of the present invention is formed around the spokes, a spoke "spider" is now produced with spokes that are "prefixtured" and locked in fixed relation to the hub flange and directed toward the rim at the optimum angle designed into the assembly. This spoke spider is now one individual component that is far easier to handle as compared with the clumsy loosely connected assembly associated with conventional wheels. This eliminates the manual spoke alignment operation, where the individual loose spoke of a conventional wheel assembly are manually directed toward their corresponding attachment hole in the rim.

An additional advantage of the present invention is the reduction in cost through the ability to utilize inexpensive and efficient manufacturing techniques in the production of component parts.

The hub and hub flange of the present invention may be produced using "net shape" molding techniques which reduce or eliminate the need for expensive machining operations. Since this design is well suited to such molding or casting operations, the desired hub geometry may be produced with few, if any, secondary machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

Since the spoke tension stresses of the present invention are distributed over a wider region of the hub flange interface, stresses are reduced within the hub flange material. Thus the strength requirements for the hub flange material are reduced and lower performance materials may be utilized, further reducing the cost as compared with conventional hubs. For example, the hardened molding material and the hub flange of the present invention may now be formed from relatively inexpensive polymer resins. These materials also lend themselves to lower-cost forming operations such as plastic injection molding. If a metallic hub flange is deemed necessary, high strength billet alloys are no longer required. Lower strength metal casting alloys, which may be formed using a casting process such as die-casting, will likely have sufficient strength.

Also, fiber reinforced injection molding compounds may now be utilized in the present invention. With these high strength composite polymers, the injection molding process permits the fibers to attain a generally random orientation within the matrix. This is a significant benefit that would not apply if the hub were machined from a fiber reinforced plastic billet. Fiber reinforced billet is normally produced by an extrusion process where the fibers become highly aligned in the direction of extrusion. Thus, a hub shell machined from such a billet would have relatively low strength perpendicular to the direction of extrusion.

Spokes of non-circular geometry, such as flat spokes, may be easily adapted to the present invention since the hub flange material is now conformed to the spoke. This is a shortcoming of conventional wheels since they are almost exclusively assembled with spokes of round cross-section. This is because the flanges must be machined to accept the spoke and it is far easier to machine a round hole than an oblong hole. Hardened molding material may create a structural portion of the hub shell or flange. The hardened molding material may also provide a matrix including reinforcement fibers or particles which impart improved mechanical properties to the solidified material.

Many of the embodiments of the present invention also illustrate the ease with which duplex spokes may be incorporated into the present invention. These duplex spokes create the equivalent of two individual spokes using only a single series of manufacturing operations and are thus less expensive to produce.

The spokes of a conventional wheel are each produced as single components and require very specific and accurate geometry to mate with the conventional hub flange. However, the spokes of the present invention are easier to produce. In many cases, manufacturing operations such as the bending or heading of the spokes are eliminated, thereby reducing the expense. Also, since the hub flange material is now formed to conform to the spoke, much of the accuracy in the spoke geometry is no longer required.

An additional advantage of the present invention is the production of a wheel which is light in weight and high in strength and reliability.

In an effort to enhance the performance of the bicycle, designers have continually aimed toward reducing the weight of its components while maintaining the strength and reliability that the marketplace requires. This is particularly true of the rotating components, such as the wheel, since any weight reduction reduces the rotational inertia as well as the static mass of the bicycle.

Due to its relaxed strength requirements, the present invention permits the use of lightweight materials to produce the hub flange component. Thus, materials such as polymers, reinforced polymers, magnesium, aluminum, among others, may now be used to construct the hub flange, saving precious weight.

Additionally, since the present invention permits the use of net-shape molding operations, the hub flange may be produced to include far more intricate geometry than would be realistic for a hub that is machined from billet. This allows the designer to eliminate material from the hub flange in the locations where it is not required, further saving precious weight.

Further, the spokes of the present invention are readily adaptable to utilize many of the high strength fibers presently available. Since the hub surrounds the fiber spoke, the spoke material may be held firmly in place in direct connection to the hub flange, thus eliminating the requirement for additional fittings or connection to adapt the spoke.

Many of the embodiments of the present invention illustrate the use of additional preformed components incorporated within the overmolding hub flange material. This allows additional components such as a preformed reinforcement or a preformed intermediate connection member to be incorporated into the design. Thus, the hub shell may be of hybrid construction and composed of several components, where each component is made from a material that particularly suits its function. For example, this allows the designer to locate components made from higher strength materials specifically where they are needed to achieve the greatest structural efficiency with the minimum weight.

As illustrated in many of the embodiments of the present invention, the J-bend of traditional spokes may be eliminated with the present invention, thereby eliminating a region where the spoke material is highly stressed and prone to failure.

Due to fabrication methods employed in conventional hub construction, it is very difficult to machine or otherwise create the details required to insure that the geometry of the hub flange conform to the spoke surface without any clearances. Such clearances allow flexure or-movement under tensile loading of the spoke, creating inconsistent spoke tension. Further, it is common practice for the builder of conventional wheels to manually bend the spokes in an attempt to conform the spoke to the hub flange and align the spoke in its direction toward the rim. This is obviously a compromise since, particularly in the case of bicycle wheels, the rim is of relatively light construction and any inconsistency in spoke tension or spoke flexure characteristics will cause the wheel to go out of true, or worse, will cause spoke breakage. When the tensile loads are not evenly shared by all of the spokes, the spokes with greater stresses will be more prone to breakage as will the portions of the rim and hub flange associated with these spokes.

The encapsulated spoke connection of the present invention results in a hub flange that fully conforms to the geometry of the spoke creating a firm connection. Therefore, the spoke tensile loads produce no relative movement between the spoke and the hub flange. The exposed portion of the spoke extends to its connection at the rim in a straight and aligned direction. Thus spoke tensile forces may now be evenly shared among the spokes of the wheel, resulting in a stronger, more reliable wheel that is less prone to broken components and is far more effective at maintaining trueness and rim alignment.

The wheel of the present invention is far less prone to broken components, particularly the spoke components. The spokes may now be permanently affixed to the hub and it will be unlikely that they will require individual replacement over the life of the wheel. This greatly simplifies the manufacturing requirements for this wheel and also reduces maintenance requirements for the end user.

Further objects and advantages of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2b is a cross-section view of a prior art bicycle wheel as seen along line 13—13 of FIG. 2a;

FIG. 3b is a partial perspective cross-section view of the embodiment illustrated in FIG. 3a as seen generally along lines 23—23 of FIG. 3a;

FIG. 4a is a perspective view illustrating a schematic representation of a lower mold half that may be used to mold the hub flange of the present invention illustrated in FIG. 3a;

FIG. 4b is a perspective view illustrating a schematic representation of an alternate embodiment of a lower mold half that may be used to mold the hub flange of the present invention in FIG. 3a;

FIG. 8a is a cross-section of the hub flange in axial plan view, illustrating an alternate embodiment of the present invention and schematically detailing the connection of the spokes and the hub flange, including spokes that are intertwined;

FIG. 8b is an axial plan view of the hub flange region, including a partial cross-section of the hub flange that schematically illustrates an alternative embodiment of the present invention, detailing the connection of the spokes and the hub flange and including an intermediate connecting member;

FIG. 8c is a partial cross section of the hub assembly, as seen generally along lines 15—15 of FIG. 8b, including the axle assembly, the spokes and an intermediate connecting member;

DETAILED DESCRIPTION OF PREFERRED EMBODIMENTS

Figure 1:
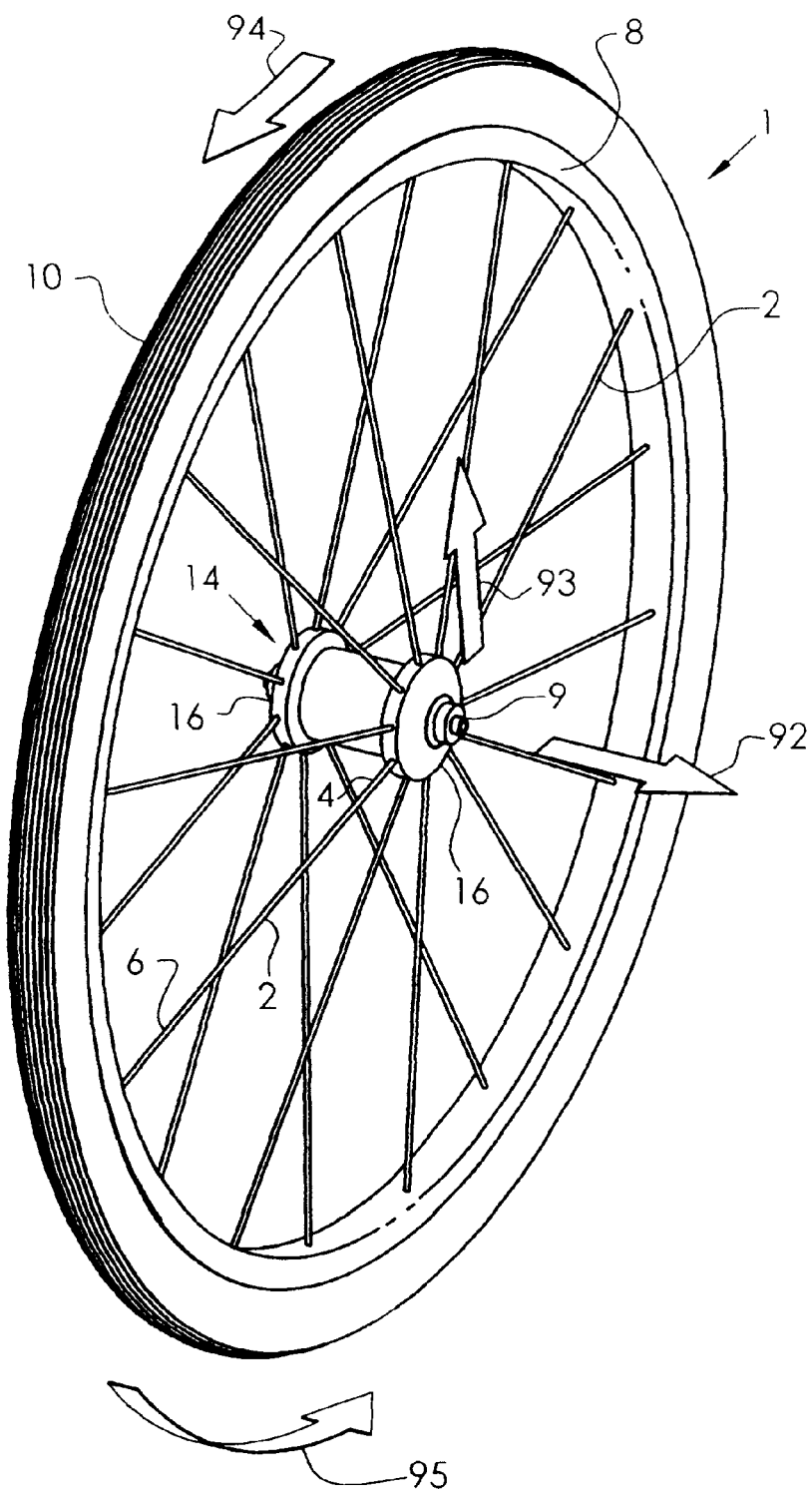
FIG. 1 is a perspective view schematically illustrating the general configuration of a vehicle wheel as applied to a bicycle wheel.

Referring to the drawings, FIG. 1 describes the basic configuration of a vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The hub flange 16 is contiguous with the hub shell 14 and may be integrally formed with the hub shell 14 or it may be separately formed and subsequently assembled to the hub shell 14. The spokes are affixed to the hub flange 16 at their inner end 4 and extend to attach to the rim 8 at their outer end 6. The tire 10 is fitted to the outer periphery of the rim 8. The axial direction 92 is any direction parallel with the axis of the axle 9. The radial direction 93 is a direction generally perpendicular to the axial direction 92. The tangential direction 94 is a direction within the plane of the rim 8 and perpendicular to the radial direction 93. The circumferential direction 95 is a cylindrical vector that wraps around the axial direction 92 at a given radius. While it is most common for the hub shell 14 to rotate about a fixed axle, there are some cases where it is desirable to permit the axle 9 to rotate with the wheel 1 such as the case where the wheel 1 is driven by the axle 9.

Thus, FIG. 1 shows a typical prior art wheel construction where spokes 2 have a first peripheral portion connected to the rim 8 and a second central portion opposed to the first portion and connected to the hub 14.

Figure 2A:
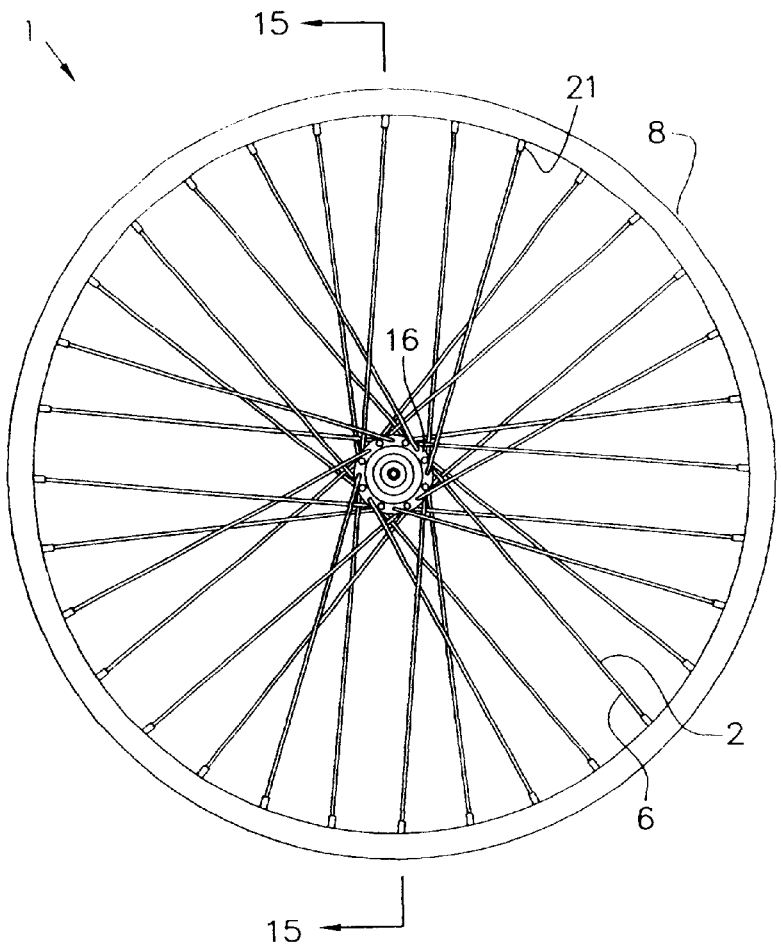
FIG. 2a is an axial plan view illustrating a prior art bicycle wheel.
Figure 2B:
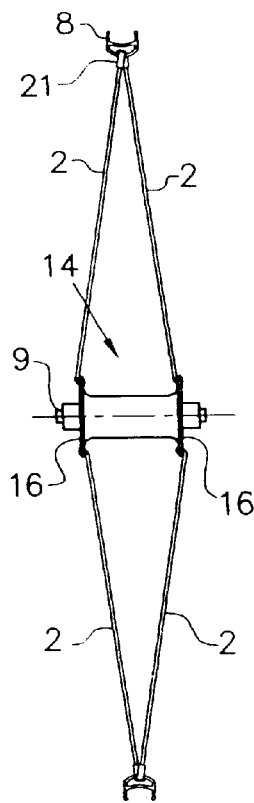
Figure 2C:
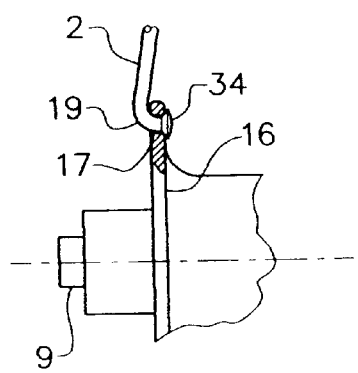
FIG. 2c is a fragmentary view detailing the view illustrated in FIG. 2b where the hub flange is shown in a partial cross-section to illustrate connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the J-bend 19 is hooked within the hole 17. The spoke 2 is then pivoted to extend in a generally radial direction toward the hole 17 in the hub flange 16 as illustrated in FIG. 2c. The outer end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are tightened, the spokes are drawn up tight and a degree of pretension is induced in the spoke 2. By selectively adjusting this threaded engagement, the spoke pretension may be adjusted to align the axial runout or trueness of the rim 8. The spoke pretension is resisted by circumferential compression of the rim 8 and it is this balance of forces which imparts efficient structural integrity to the bicycle wheel 1.

The present invention relates to the connection arrangement between the hub 14 and/or rim 8 and at least one spoke 2. In the preferred embodiment, the present invention relates to the connection arrangement between the hub and the spokes and the exemplified embodiments will be discussed in connection with the hub-spoke connection; however, the present invention is applicable to the rim-spoke connection as well as, or in addition to, the hub-spoke connection. More specifically, the present invention particularly involves a partially or fully encapsulated connection between the hub flange 16 and a spoke 2 or plurality of spokes 2 where the spoke 2 is a preformed structural element. This encapsulated connection is achieved through the softening of the hub flange 16 material such that it may be conformed to surround, and thus engage, a portion of the spoke 2. When the hub flange 16 material is subsequently hardened, the result is a firm connection between the hub flange 16 and spoke 2.

Figure 3A:
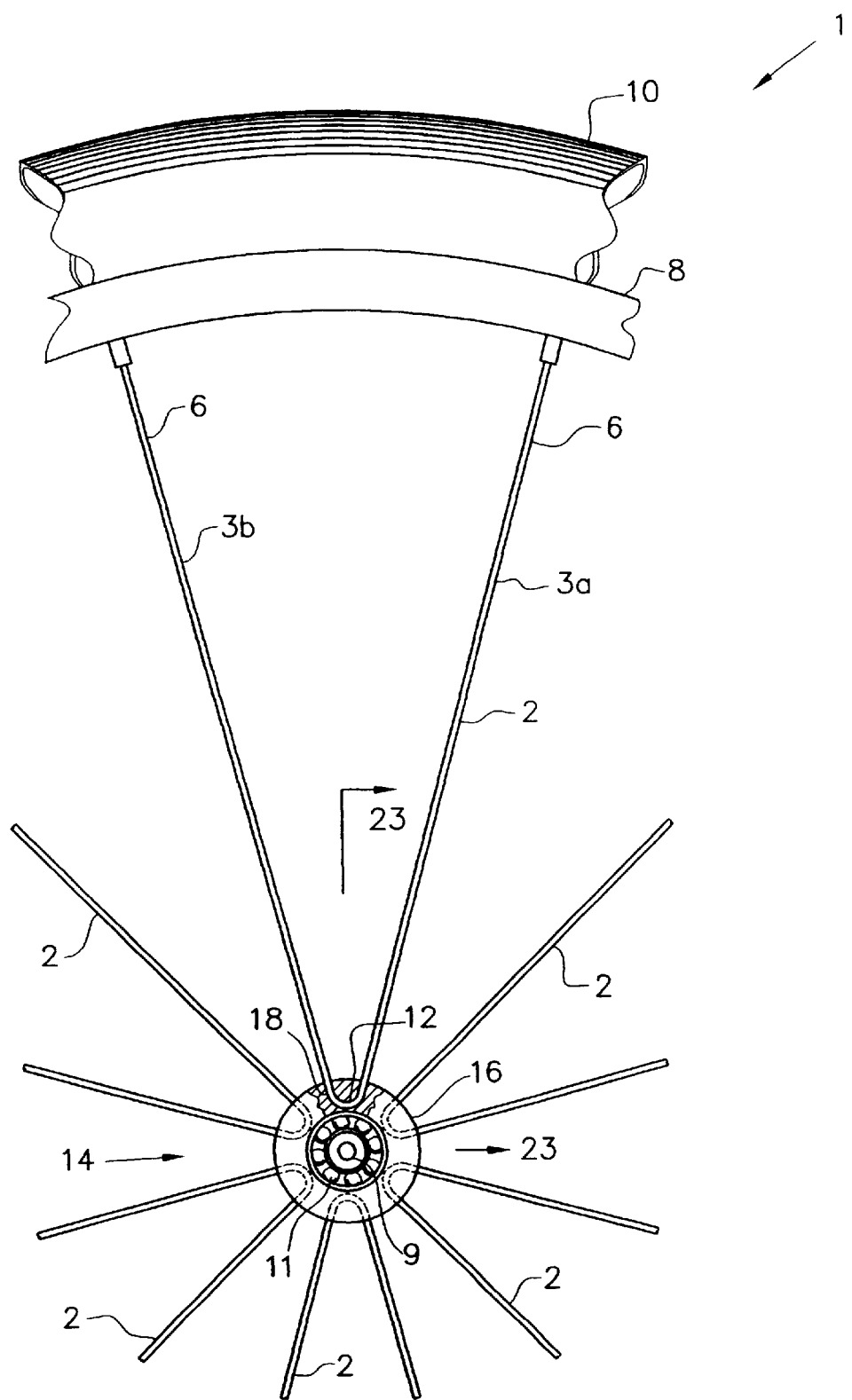
FIG. 3a is a fragmentary axial plan view illustrating a schematic representation of an embodiment of the present invention.

FIG. 3a describes a basic embodiment of the present invention in plan view. The wheel 1 includes spokes 2 that are connected at their outer ends 6 to the rim 8 either directly or with spoke nipples or the like. The tire 10 is mounted to the rim 8 in the standard manner and the hub shell 14 is rotatable about the axle 9 via the bearings 11. The midpoint of the spoke 2 includes a bent portion 12 that is surrounded by the material of the hub flange 16. Thus an encapsulated region 18 of the spoke 2 is shown which serves to lock the spoke 2 into a fixed connection directly with the hub flange 16. This embodiment describes what may be referred to as a "duplex spoke" where the spoke 2 includes two structural portions or spans 3a and 3b, with each span extending between the hub flange 16 and the rim 8. These two structural portions or spans 3a and 3b are contiguous with each other and integrally formed or connected to each other in the region of the hub flange 16. This figure shows a multiplicity of spokes 2 as molded within a single hub flange 16. This is a most desirable arrangement since it requires only a single molding operation to encapsulate several spokes 2. The molded hub flange 16 in this figure is formed to create a structural portion of the hub shell 14.

It is easiest to mold the individual hub flange 16 separately and then assemble these hub flanges 16, along with other components as required, to create a complete hub shell 14. This hub shell 14 assembly may be permanent or else it may be removably assembled, allowing the hub flange 16 to be disassembled from at least a portion of the hub shell 14 for servicing in the field. However, it is also anticipated that the hub shell 14, including hub flanges 16, may be molded or otherwise formed together as a unit, including the corresponding spokes 2.

Figure 3B:
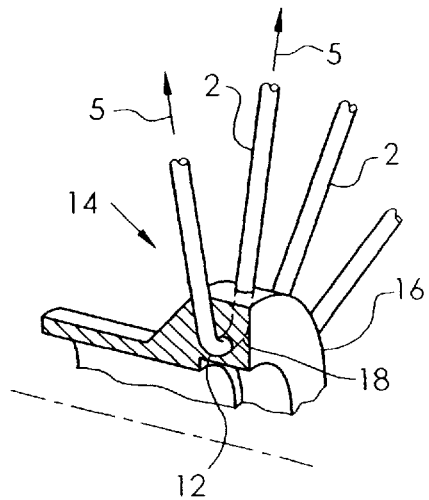

The encapsulated region 18 of the spoke 2 of the embodiment described in FIG. 3a is further detailed in FIG. 3b where the material of the hub flange 16 is shown to fully surround the exterior surface of the spoke 2 in the encapsulated region 18 of the spoke. Thus a firm connection between the spoke 2 and the hub flange 16 is created that will be capable of withstanding the spoke tension forces 5 during operation of the wheel 1.

As is well known in the art, a wheel may be of tension-spoke construction, where the hub hangs in tension by the spokes from the rim portion directly above, or it may be of compression-spoke construction, where the hub is supported by compressing the spoke directly beneath it. Since the present invention is directed toward bicycle wheels and since the tension-spoke wheel is generally a more efficient structure, most of the discussion herein is focused with an eye toward tension-spoke wheel construction. However, it is anticipated that most, if not all, of the embodiments of the present invention may be applied to compression-spoke wheel construction as well. For a tension-spoke wheel, it is a requirement that the wheel include at least two hub flanges that are axially spaced on either side of the rim or, more specifically, the spoke attachment points at the rim. Thus, the spokes fixed to opposite hub flanges must converge as they extend toward the rim.

Figure 4A:
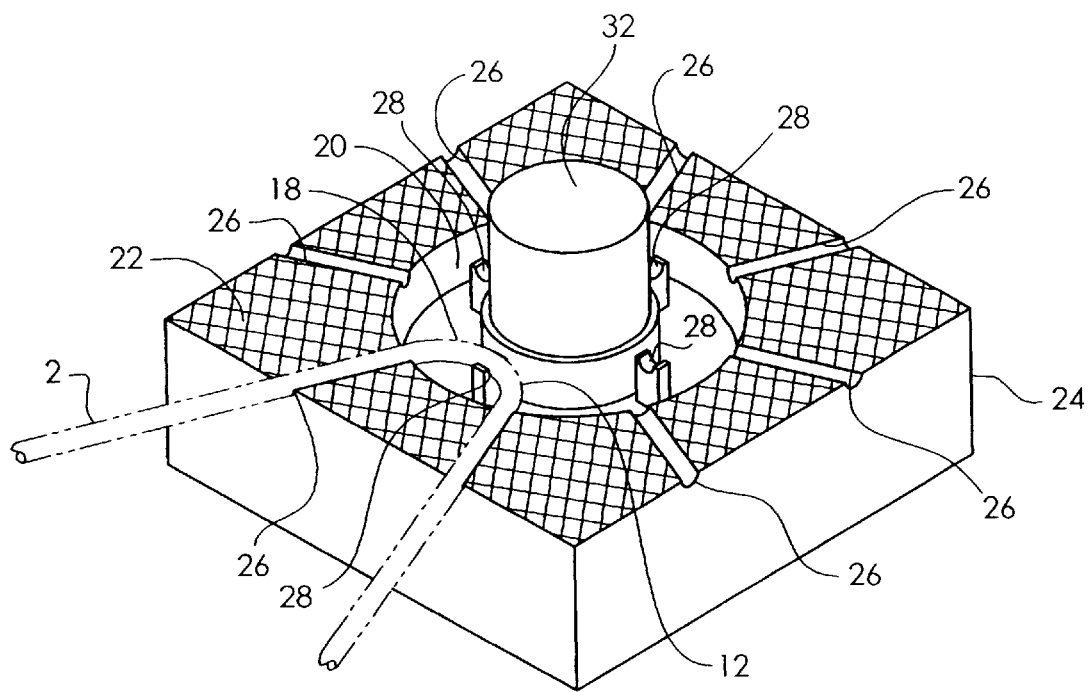

FIG. 4a describes a representative method of molding the hub flange 16 to surround the spokes 2 of the embodiment described in FIGS. 3a and 3b. In order for the encapsulated portion 18 of the spoke 2 to become completely surrounded by the material of hub flange 16, the spoke must be suspended within the mold cavity 20. This permits the liquid molding material to circumfuse and flow around the spoke 2, thus encapsulating and locking the spoke 2 upon subsequent solidification of the molding material. This figure only illustrates a lower mold half 24 and it is understood that a mating upper mold half would ideally be required to create a fully enclosed molding cavity 20. The upper mold half and the lower mold half 24 contact each other at the parting line surface 22 indicated by crosshatch marks. The mold half 24 includes spoke locating nests 26 that are shaped to conform to the surface of each spoke 2 and which intersect the plane of the parting line surface 22. Each spoke 2 is set to rest within its mating spoke locating nest 26 with the bent portion 12 of the spoke 2 cantilevered and extended within the mold cavity 20. When the upper mold half is joined to the lower mold half 24, the spoke 2 is captured and located within the mold parting line surface 22 and extending into the mold cavity 20 so that the liquid molding material may then fill the mold cavity 20 and encapsulate the spoke 2. The parting line generally creates a parting or witness line in the final product. Also indicated are internal spoke locating supports 28 which provide additional spoke locating means although they are located within the spoke cavity 20 itself. However, when the solidified hub flange 16 is ejected from the mold, these spoke-locating supports 28 will leave a small region where the encapsulated portion 18 of the spoke is left exposed. The mold half 24 shown here also includes a cylindrical core pin 32 which is used to form a concentric through opening in the molded hub flange 16 to provide a mounting bore for the axle bearings 11 or clearance for the axle 9.

Figure 4B:
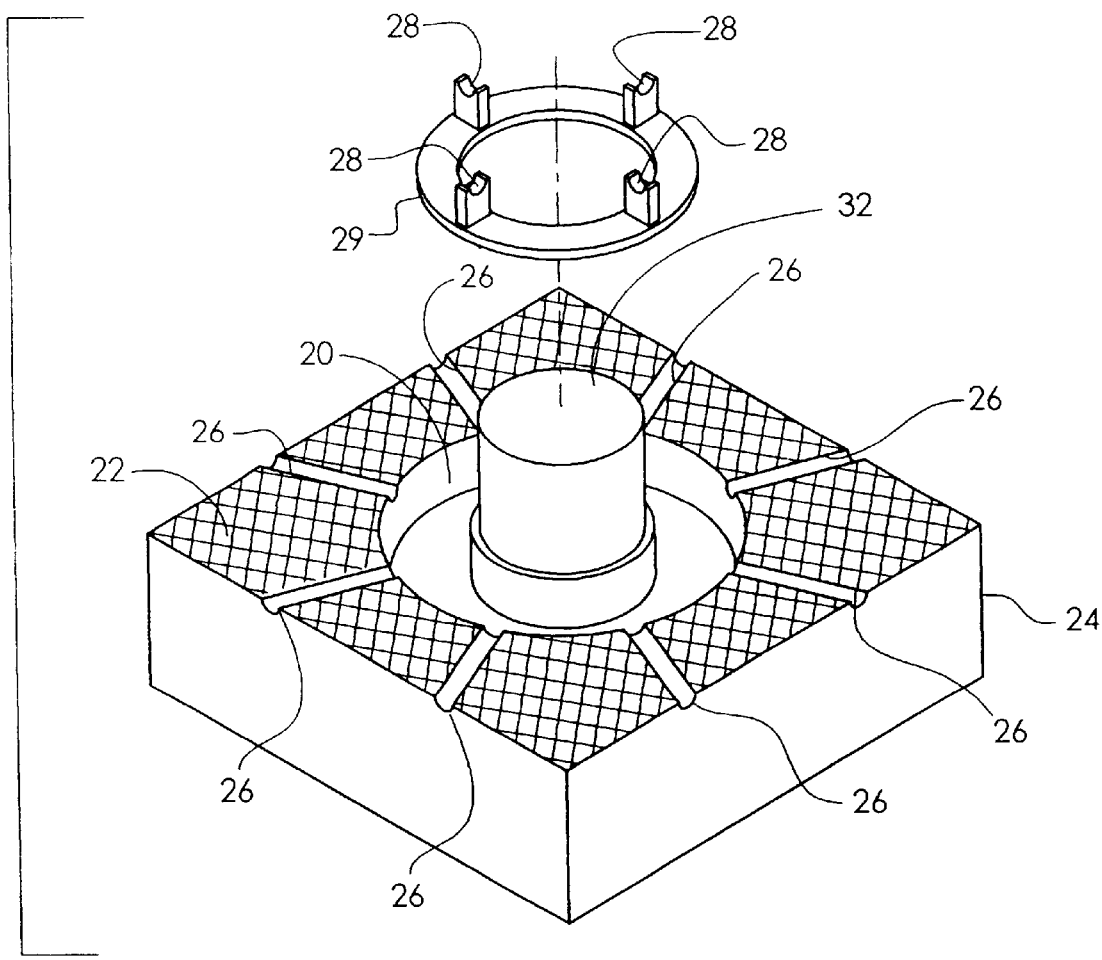

FIG. 4b describes a lower mold half 24 that is similar to the one described in FIG. 4a, however, in this figure, the internal spoke locating supports 28 are not fixed to the mold, but instead are loosely located within the mold cavity 20 such that, when the solidified hub flange 16 is ejected from the mold, these spoke locating supports 28 remain with the hub flange 16. Further, the individual spoke-locating supports 28 shown here are joined to each other via a joining flange 29 which, since it will become part of the hub flange 16, may serve to structurally reinforce the hub flange material or otherwise augment the connection between the spoke 2 and the hub flange 16.

As described in these figures, the hub flange 16 material is molded in a liquid or semi-liquid state to encapsulate a variety of components so that, upon solidification, these components are locked or captured within the hub flange 16. The liquefaction and subsequent solidification of the hub flange 16 material may normally be achieved through one of two basic mechanisms:

(1) The hub flange 16 material may be heated by an external source to its melting or softening point and molded such that, upon subsequent cooling of the material, the molded part is resolidified to create a structural part. Compatible materials for this type of molding process include metals and thermoplastic polymers. These materials may be molded using a wide variety of methods and processes known to industry. Die casting, in the case of metals, and injection molding, in the case of thermoplastic polymers, are molding processes particularly applicable to these embodiments.

(2) Additionally, there exists a class of polymers known as thermoset materials that are available as a liquid or soft solid that may be subsequently solidified or hardened through a process of chemical reaction, usually involving a resin and a catalyst. Thermoset epoxies, polyesters, vinylesters and urethanes as well as other materials are available in industry and may be applicable to these embodiments whereby the hub flange may be molded or cast while the material is in the liquid state. Upon catalyzation and solidification of the thermoset material, the part may be removed from the mold.

Further, the hub flange may be molded from a composite material where the liquefiable matrix includes reinforcement fibers or particles within the mold cavity for a significant increase in the mechanical properties of the hub flange material and/or beneficial molding characteristics.

Figure 5A:
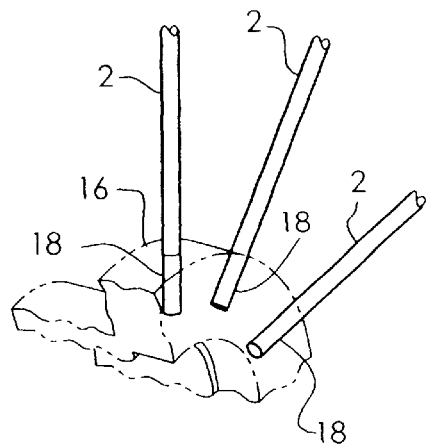
FIGS. 5a–k are partial perspective views, each an alternate embodiment of the present invention that schematically details the connection of the spokes with the hub flange.

As shown in FIG. 5a, a "single spoke" 2, which includes only a single structural portion that terminates at the hub flange 16, may be substituted for the duplex spoke 2 of FIG. 3a. The single spoke 2 includes an encapsulated portion 18 that resides within the hub flange 16 material. Since the spoke 2 shown here is straight and smooth within the encapsulated region 18, the primary mechanism through which the external surface of the spoke 2 is affixed to the hub flange 16 material is adhesion. To augment this adhesive connection, it is often desirable to include some degree of mechanical interlock at the interface between the spoke 2 and the hub flange 16.

Figure 5B:
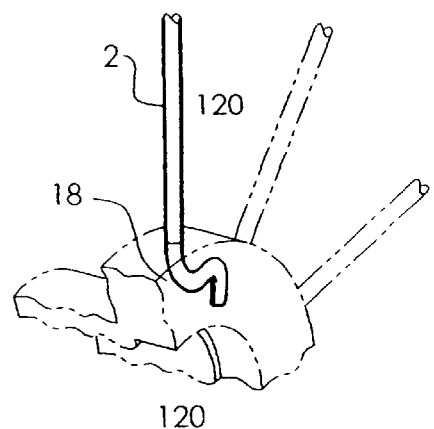

As shown in FIG. 5b, the spoke 2 may also include a bent region 120 within the encapsulated portion 18 to provide mechanical interlock with the hub flange 16 material. The multiple spoke bends of bent region 120, as shown in FIG. 5b, provide an even greater degree of mechanical interlock than a single bent region 120 as shown in FIG. 3a. Thus the mechanical interlock provided by the bent region 120 serves to lock the spoke 2 within the hub flange 16 and provide resistance to pull-out of the spoke. Additionally, the multiple bent region 120 creates a lateral extension within the encapsulated region 18, thus preventing any twisting of the spoke 2 relative to the hub flange 16.

Figure 5C:
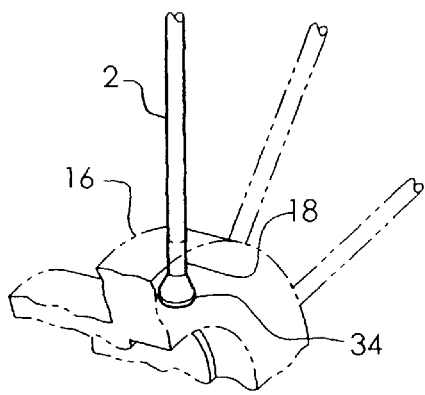

FIG. 5c describes a spoke 2 which includes an enlarged portion 34 within the encapsulated region 18 to create a mechanical interlock engagement between the spoke 2 and the hub flange 16 material. The enlarged portion 34 is shown in this figure to be integrally formed with the spoke 2, however the enlarged portion 34 may alternatively be a separately formed part that is firmly affixed to the spoke 2.

Figure 5D:
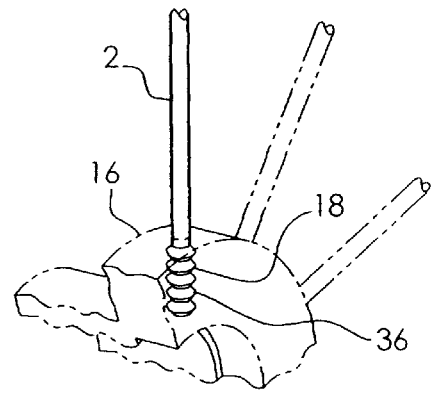

An additional method of creating mechanical interlock at the interface between the spoke 2 and the hub flange 16 is to provide a configured portion, such as a knurled portion 36 in the encapsulated portion 18 of the spoke 2 as illustrated in FIG. 5d. In this figure, the cross-section of the spoke 2 is variable within the encapsulated portion 18 to lock the spoke 2 within the hub flange 16. A similar effect may be achieved by forming a machine thread or embossed region or the like in place of the knurled surface as shown.

Figure 5E:
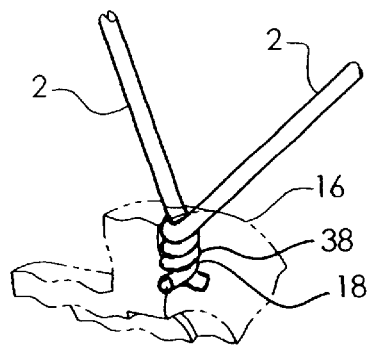

FIG. 5e describes a duplex spoke 2 in an arrangement similar to FIG. 3a that is formed by intertwining two individual spokes 2. As shown in FIG. 5e, it is advantageous to locate this intertwined region 38 within the encapsulated portion 18 of spokes 2 to provide additional mechanical interlock engagement between spoke 2 and the hub flange 16 material.

Figure 5F:
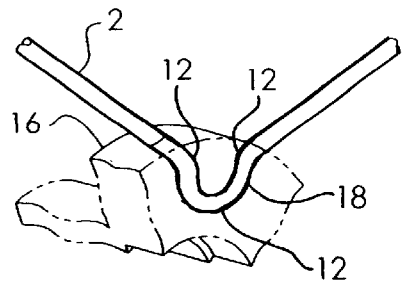

FIG. 5f describes an embodiment similar to FIG. 3a, however this figure shows a duplex spoke configuration which includes additional bent portions 12 which serve to redirect the angle of the spoke 2 as it spans toward the rim 8. In this figure, the spoke 2 approaches the hub flange 16 at a somewhat oblique ii orientation rather than the directly radial orientation described in FIG. 3a. Such an oblique orientation allows the wheel to transmit torque between the hub shell 14 and the rim 8 more effectively, an arrangement well known in industry, corresponding to increasing the number of spoke crosses of a conventional wheel. While it is envisioned that the bent portion 12 of the spoke 2 may be located external to the encapsulated portion 18, it is desirable to locate such bent portions 12 within the encapsulated portion 18 as shown, since this allows the bent portion 12 to be supported by the hub flange 16 material, thereby minimizing any inconsistent or unwanted flexure of the spoke. Thus, it is desirable that the straight alignment of the spoke 2, as it spans between the rim 8 and hub flange 16, continue within at least a portion of the encapsulated portion 18 of the spoke.

Figure 5G:
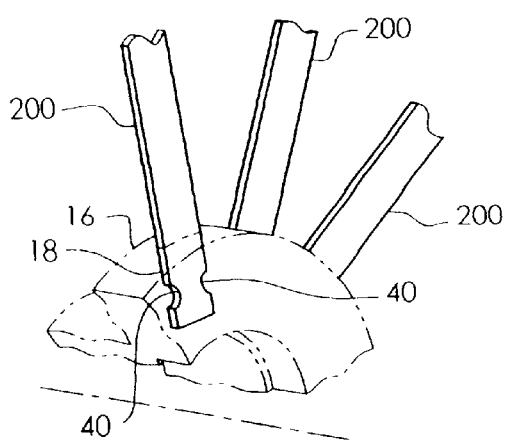

The spoke 200 of FIG. 5g is of generally flat cross section and includes two notches 40 that are located within the encapsulated region 18. These notches 40 create a disruption in the cross section of the spoke, thus providing a mechanical interlock engagement between the spoke 200 and the hub flange 16.

Figure 5H:
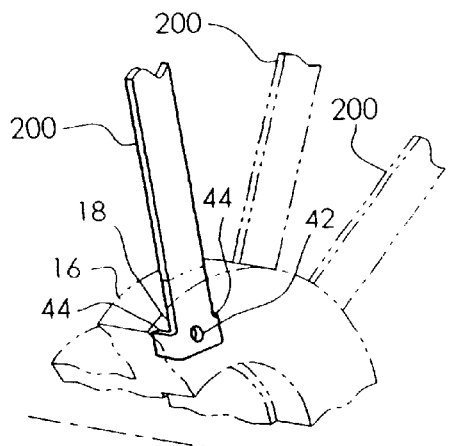

The spoke 200 of FIG. 5h includes two bent tabs 44 within the encapsulated region 18. These bent tabs 44 provide a mechanical interlock between the spoke 200 and the hub flange 16. In addition, the spoke includes a through opening 42 within the encapsulated region 18. The encapsulating hub flange 16 material flows through to fill this opening 42 during molding and serves to provide additional mechanical interlock between the spoke 200 and the hub flange 16.

Figure 5I:
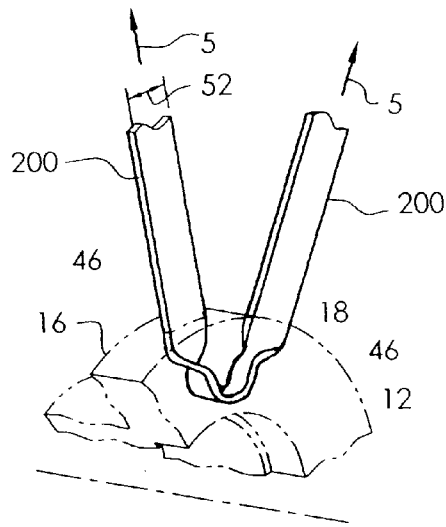

The spoke 200 of FIG. 5i is of generally flat cross section and includes a twisted portion 46 that serves to reorient the flat cross section of the spoke 200. It is generally desirable to orient the flat spoke 200 so that its width 52 is oriented in an axial direction in the bent region 12 within the encapsulated portion 18 as shown. This provides the greatest surface area of mechanical interlock perpendicular to the direction of spoke tension 5 for resistance to pull-out of the spoke 200. However, in the exposed region of the spoke 200, it is desirable to orient the width 52 in a tangential direction as shown, so that aerodynamic drag due to rotation of the wheel 1 is minimized. Further, it is desirable to locate the twisted portion 46 of the spoke 200 within the encapsulated portion 18 to provide increased mechanical interlock with the hub flange 16 and also to lock the twisted portion 46 in its proper orientation.

Figure 5J:
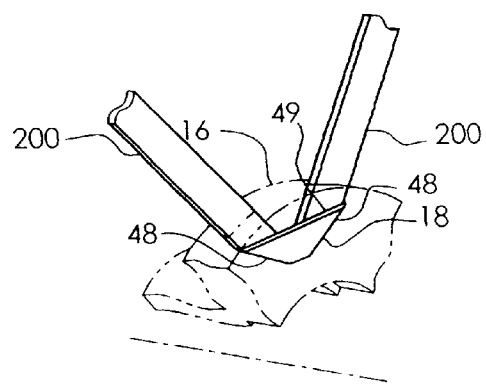

FIG. 5*j* describes a flat spoke 200 that includes a folded portion 48 which resides within the encapsulated portion 18 of the spoke 200. This folded portion 48 creates a pocket-like portion 49 that serves to provide mechanical interlock between the spoke 200 and the hub flange 16. Further, the folded portion 48 provides a convenient method for directing the exposed portion of the duplex spoke 200 in the desired orientation to span toward the rim 8.

Figure 5K:
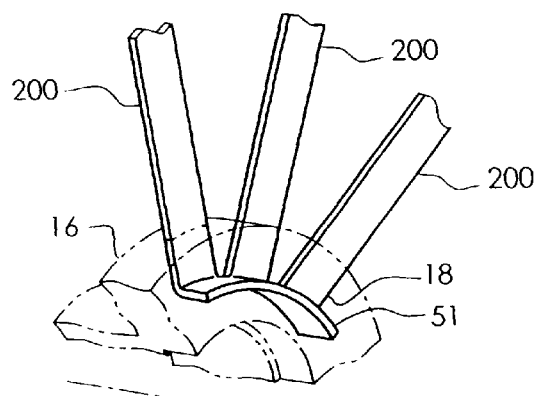

FIG. 5*k* describes a multi-spoke configuration where three or more spokes 200 are connected at a common end. In this figure, three spokes 200 are connected with a common flange 51. The flange 51, shown here, is located to be encapsulated by the hub flange 16 and is contiguous with the individual spokes 200. Desirably, flange 51 is oriented at an angle of 90° or less with respect to the spokes 200.

Figure 5M:
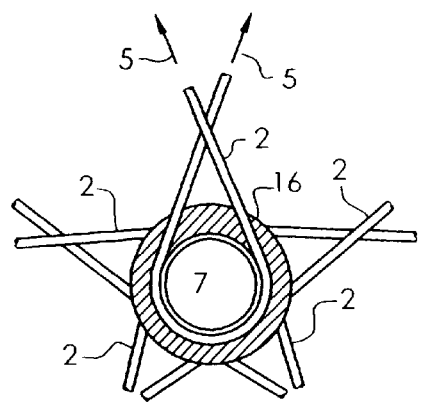
FIG. 5m is a cross section view of the hub flange of an alternate embodiment of the present invention shown in axial plan view and schematically illustrating the path of the spokes.

FIG. 5*m* describes an embodiment in which the spoke path is wrapped to encircle or at least partially circumscribe the bearing bore 7 of the hub flange 16. Since the spoke 2 material is generally stiffer and stronger than the hub flange 16 material, this circumferentially wrapped spoke 2 serves to provide hoop strength reinforcement to the hub flange 16. By incorporating two or more of such wrapped spokes 2, which are circumferentially distributed around the hub flange 16, the spoke tensile loads 5 tend to impart a radially compressive stress on the hub flange 16. This is because the spoke 2 wraps around the radially opposite side of the hub flange 16. In contrast, the embodiment described in FIG. 3*b* shows that the spoke tensile loads 5 impart a radial tensile stress on the hub flange 16. While the spoke 2 of FIG. 5*m* is wrapped against the outside diameter of the bearing bore 7, the spoke 2 may also be located to encircle a region spaced radially outward from the bearing bore 7.

Multi-filament spokes are spokes that are constructed from a bundle of parallel filaments or fibers that run generally along the length of the spoke. There are many high performance fibers that have become available which have very high tensile strength and stiffness properties, making them ideal for application to vehicle wheel spokes. These fibers are usually available in bundles or yarns and may be supplied as unsupported fiber or they may be impregnated by a matrix resin which encapsulates and binds these fibers. To produce a spoke, these yarns may be combined into a larger bundle or may be commingled by any of a number of processes including braiding, twisting or knitting.

Since each multi-filament fiber bundle or yarn may contain thousands of fibers, each having its own exterior surface, it is possible to create a highly effective anchoring connection by adhering to the individual fibers through circumfluent encapsulation of the hub flange 16 material. Thus, FIG. 6*a* and FIG. 6*b* describe an embodiment where the splayed fibers 54 of a plurality of multi-filament spokes 2' are encapsulated by the hub flange 16 material. During molding, the liquid hub flange material is flowed to encapsulate the splayed fibers 54 and upon solidification, the spokes 2' are firmly anchored to the hub flange 16.

Figure 6A:
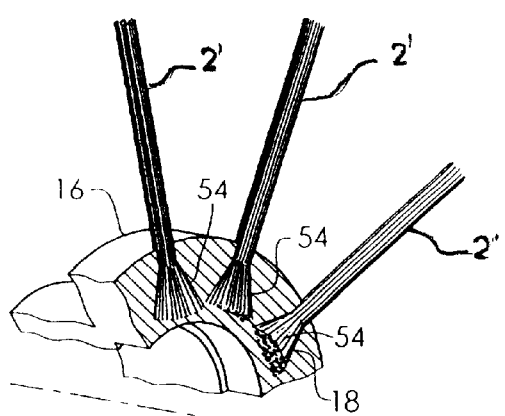
FIG. 6a is a partial perspective view, showing the hub flange in cross-section and schematically illustrating an alternate embodiment of the present invention that details the connection of the spokes with the hub flange.
Figure 6B:
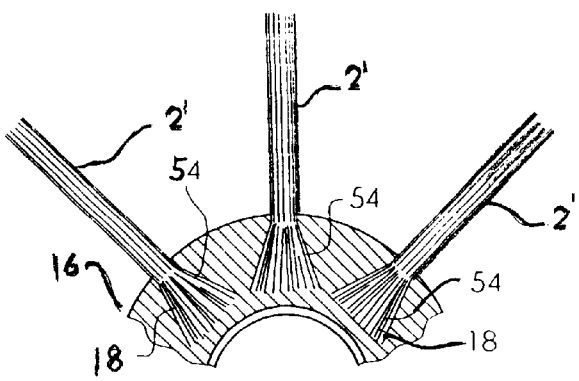
FIG. 6b is a partial cross-section of the hub flange, in axial plan view, illustrating the embodiment of FIG. 6a and schematically detailing the connection of the spokes with the hub flange.

In order to effectively encapsulate the individual fibers, it is desirable to spread the fibers and expose at least a portion of their outer surfaces to the encapsulating material. FIG. 6*a* and FIG. 6*b* describe an embodiment where the spoke 2' is created from a multi-filament yarn bundle. The encapsulated portion 18 of the spoke 2' includes a region of splayed fibers 54, allowing a sufficient amount of hub flange 16 material to encapsulate and bond to the individual filaments or fibers and create a firm connection. As shown here, a multiple of spokes 21 may be connected to a single hub flange 16 in this manner. It is further envisioned that, in addition to the hub flange 16, the encapsulated portion 18 may be extended to include the encapsulation of at least a portion of the spoke span between the hub flange 16 and the rim 8. This is particularly applicable to spokes 2' of multi-filament construction where the encapsulating material may extend to include at least a portion of the length of the spokes and thereby provide a binding matrix to the filaments, as shown for example by extended encapsulating material 55 in a partial view in FIG. 6*c*. Naturally, this may be effectively used in the other embodiments of the present invention.

Figure 6C:
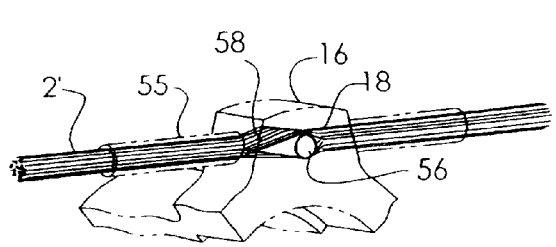
FIG. 6c is a partial perspective view, showing the hub flange and schematically illustrating an alternate embodiment of the present invention that details the connection of the spokes with the hub flange.
Figure 6D:
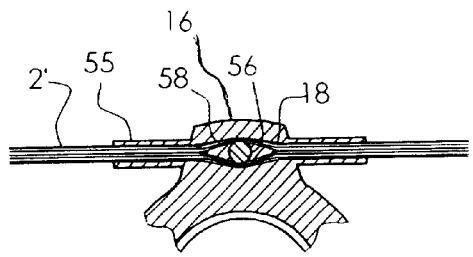
FIG. 6d is a partial cross-section of the hub flange, in axial plan view, illustrating the embodiment of FIG. 6c and schematically detailing the connection of the spokes with the hub flange.

While the fibers of a multi-filament yarn bundle will often tend to splay on their own, it may be desirable to utilize a solid element to wedge the fibers apart to create an effectively splayed or spread region 58 within the encapsulated portion 18 of the spoke 2'. As shown in FIG. 6*c* and FIG. 6*d*, a pin 56 is utilized to wedge the fibers apart, creating a region of spread fibers 58. Thus, during molding, the liquid hub flange 16 material is flowed between and amongst the spread fibers 58. Upon solidification of the hub flange 16 material, the spokes 2' are firmly anchored to the hub flange 16. The pin 56 may or may not remain with the hub flange 16 subsequent to molding.

Figure 6E:
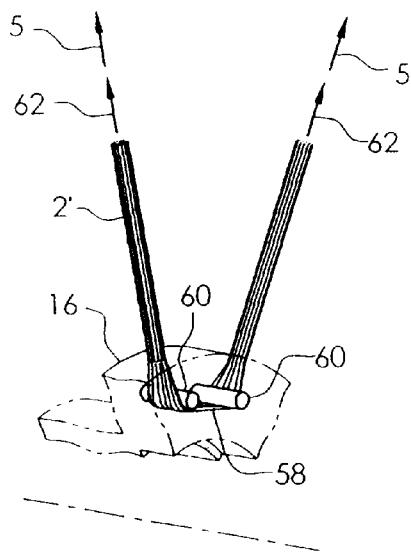
FIG. 6e is a partial perspective view, showing the hub flange and schematically illustration an alternate embodiment of the present invention that details the connection of the spokes with the hub flange.
Figure 6F:
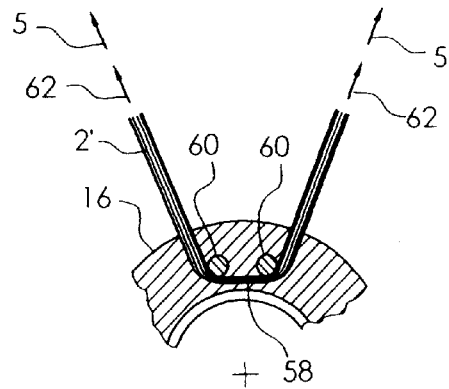
FIG. 6f is a partial cross-section of the hub flange, in axial plan view illustrating the embodiment of FIG. 6e and schematically detailing the connection of the spokes with the hub flange.

Particularly in the case where multi-filament yarns are unsupported by a resin matrix, the multi-filament material is easily draped, but may have little ability to hold much of a form. Thus, the yarn bundle will tend to droop and sag in any region where it is unsupported. Multiple yarns may be knitted, twisted or braided together to create a multi-filament spoke cord that is somewhat stiffer than a yarn with straight fibers, but may yield only a moderate reduction in droop. However, like a string, when the filaments are tensioned and pulled taut between two or more solid points, they will then effectively be able to hold their form. This is the principle outlined in FIG. 6*e* and FIG. 6*f* where the spoke 2' is wrapped around solid members or pins 60 and pretensioned 62 so that the multi-filament yarn bundle remains taut during the molding process and the filaments are desirably aligned in tension during the molding process. The pins 60 function in a similar manner to the spoke locating support 28 described in FIG. 4*a*. Further, because the pins 60 have straight sides, the round yarn bundle will tend to conform to the cylindrical pin and create a flat web region of spread fibers 58 as it is stretched over the straight surface. Thus, during the molding of the hub flange 16, the liquid material circumfuses the fibers within the encapsulated portion 18 and, upon solidification of the hub flange 16 material, the spokes 2' are firmly anchored to the hub flange 16. Alternatively, the pins or solid members may be affixed to the mold and need not necessarily remain encapsulated.

Further, when multi-filament yarn is pretensioned, the individual filaments are pulled into taut alignment, allowing the individual filaments to evenly share the tensile loads. If some of the fibers of a multi-filament spoke 2' are permitted to slacken while others are taut, the tensile forces will first be taken up by the shorter taut fibers. This creates unevenly shared tensile loading among the filaments of the bundle and reduces the effective tensile strength and stiffness of the spoke 2'. Pretensioning the spoke 2' during the molding process is helpful to align the individual fibers and insure that their lengths are even and consistent, permitting the strength of the spoke 2' to reach its full strength capacity after the filaments are locked to the hub flange 16 material.

Figure 6G:
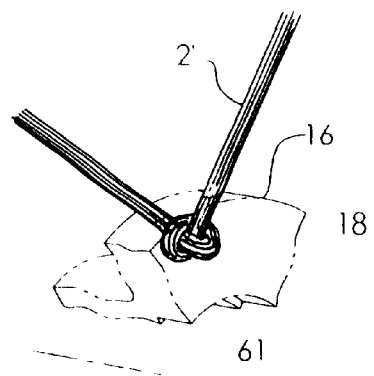
FIG. 6g is a partial perspective view, showing the hub flange and schematically illustrating an alternate embodiment of the present invention that details the connection of the spokes with the hub flange.
Figure 6H:
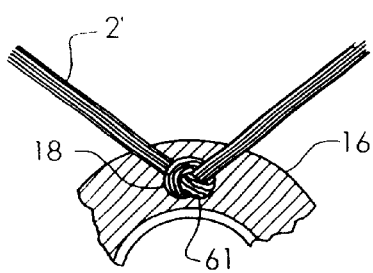
FIG. 6h is a partial cross-section of the hub flange, in axial plan view, illustrating the embodiment of FIG. 6g and schematically detailing the connection of the spokes with the hub flange.

FIGS. 6g–h describes an embodiment where the multi-filament spoke 2' includes a knotted portion 61 within the encapsulated portion 18 within the hub flange 16 material similar to enlarged portion 34 in FIG. 5c, creating a mechanical interlock connection similar to that described in FIG. 5c. The knot 61 also serves to bind the fibers of the bundle to each other and minimize any relative slippage of individual fibers. Alternatively, a ring or sleeve may be crimped around the fiber bundle to achieve an effect similar to the knot 61.

Figure 7A:
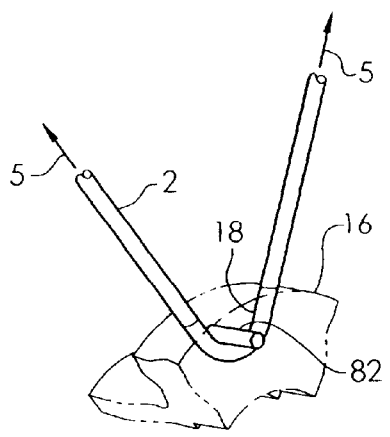
FIG. 7a is a partial perspective view schematically illustrating an alternate embodiment of the present invention that details the connection of the spokes with the hub flange, including a reinforcement pin.
Figure 7B:
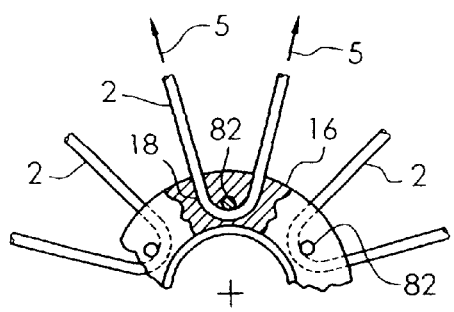
FIG. 7b is a partial cross-section of the hub flange, shown in axial plan view, illustrating the embodiment of FIG. 7a and schematically detailing the connection of the spokes with the hub flange, including a reinforcement pin.

While the spokes are generally formed from a reasonably high strength material, the hub flange 16 is usually of thicker cross section and may be formed from a material of lower strength. However, since the spokes usually have thin cross section, the spoke tension force 5 induces high contact stresses in the hub flange 16 material at the juncture where these components are connected. Thus, it may be desirable to incorporate an additional component within the assembly that serves to distribute this force 5 over a broader area of the hub flange 16 material to reduce this contact stress. This principle is illustrated in FIGS. 7a and 7b where a reinforcement pin 82 is made to contact the spoke 2 within the encapsulated region 18. The reinforcement pin 82 is engaged with the hub flange 16 and is positioned to resist the spoke tension forces 5. Thus, the contact stresses on the hub flange 16 material due to the spoke tension forces 5 are distributed over the length of the pin 82 and are thereby reduced. Particularly in this type of configuration, it is desirable to pretension the spokes 2 during molding to accurately locate the spoke and insure that the spoke 2 is brought into contact with the pin 82 to create an effective transfer of the spoke tension force 5.

Figure 7C:
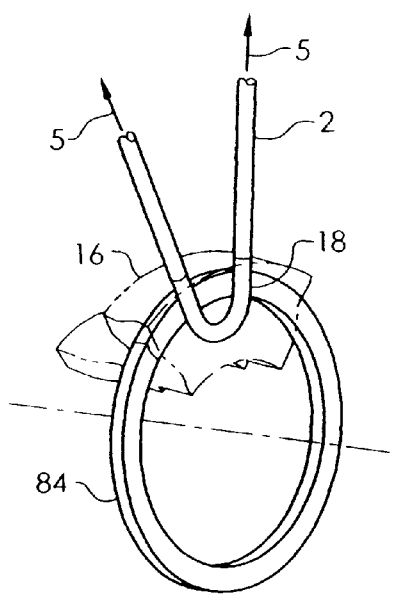
FIG. 7c is a partial perspective view schematically illustrating an alternate embodiment of the present invention that details the connection of the spokes with the hub flange, including a reinforcement ring.
Figure 7D:
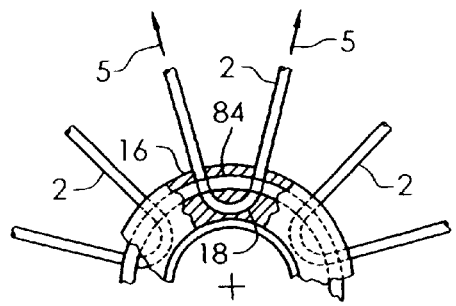
FIG. 7d is a partial cross-section of the hub flange, shown in axial plan view, illustrating the embodiment of FIG. 7c and schematically detailing the connection of the spokes with the hub flange, including a reinforcement ring.

While the spoke tension forces 5 may induce high contact stresses within the hub flange 16 material, these forces may also induce large hoop stresses within the hub flange 16 material as well. These hoop stresses are particularly high when the spokes 2 of the wheel 1 extend from the hub flange 16 in a radial direction as described in FIG. 3a. Such spoke tension forces 5, when distributed around the full periphery of the hub flange 16, create radial stresses that induce the hub flange 16 to expand outwardly. A method that may be utilized to resist these stresses is illustrated in FIGS. 7c and 7d where a preformed annular reinforcement ring 82 is made to contact the hub flange 16 material over its circumference. The reinforcement ring 84, as illustrated in these figures, is encapsulated within the hub flange 16 material adjacent the encapsulated portion 18 of the spokes 2. Although it may not necessarily contact the spokes 2, the reinforcement ring 84 is of sufficient strength and stiffness to reinforce the hub flange 16 and to resist the radial stresses and strains induced by the spoke tension forces 5. Although FIGS. 7c and 7d describe the reinforcement ring 84 as being encapsulated within the hub flange 16 material, it may also be placed so as to wrap around the outside diameter of the hub flange 16 to reduce the radial stresses. It is also envisioned that the reinforcement ring 84 may be contiguous with an auxiliary component or portion of the hub shell 14 that is joined to the hub flange 16.

Since the hub flange 16 material is usually weaker than the spoke material, it is often desirable to reduce the stresses imparted on the hub flange by the spokes. This may be achieved by either reinforcing the hub flange 16 with a strong material or by linking the spokes 2 to each other so that tension forces 5 are distributed to other spokes 2 within the hub flange 16. FIG. 8a describes an embodiment where each spoke 2 is intertwined, and thus linked, to its neighboring spoke 2 and to create a daisy chain of interconnected spokes 2 around the hub flange 16. Thus, much of the spoke tension force 5 carried by the spoke 2 is transferred to its neighboring spoke 2 and the portion of spoke tension force 5 carried by the hub flange 16 may be reduced as compared to the embodiment described in FIG. 3a. In FIG. 8a, the intertwined portions 138 of the spokes 2 are located within the encapsulated portion 18 which creates an effective locking arrangement between the spokes 2 and the hub flange 16.

Another method of linking the spokes together is to connect them to each other via an intermediate connecting member 66 that is encapsulated within the hub flange 16. One such embodiment is described in FIG. 8b and FIG. 8c which shows an intermediate connecting member 66 that is overmolded by a hub flange 16 or a hub flange which otherwise is also contiguous with the main body of the hub shell 14. The spokes 2 include a threaded portion 64 which mates with the intermediate connecting member 66 to create a firm connection. The hub shell 14 is designed such that the spokes 2 are fastened to the intermediate connecting member 66 before it is overmolded by the hub flange 16. An alternative design could dictate that the spokes are assembled to the intermediate connecting member 66 subsequent to the overmolding operation. This would allow individual spokes 2 to be replaceable in the field. While a threaded connection between the spoke 2 and the intermediate connecting member 66 is preferred, a wide variety of joining methods may be substituted to achieve this connection. In this figure, the intermediate connecting member 66 includes a collar 68 which includes a bearing bore 7 to carry the axle bearing 11. The axle 9 is fitted through the bore of the bearing 11 and through the bore of the sleeve 13 to create a stationary axle arrangement, allowing the hub shell 14 to rotate.

Figure 8D:
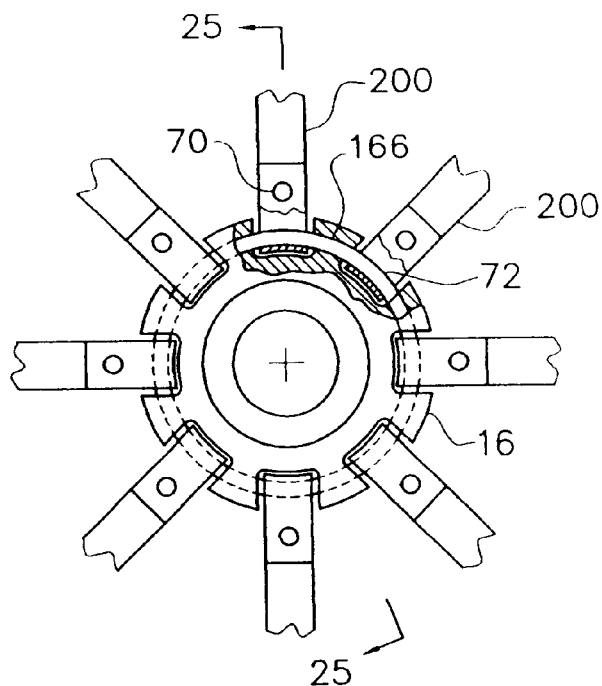
FIG. 8d is an axial plan view of the hub flange region, including a partial cross-section of the hub flange that schematically illustrates an alternative embodiment of the present invention, detailing the connection of the spokes and the hub flange and including an intermediate connecting member.
Figure 8E:
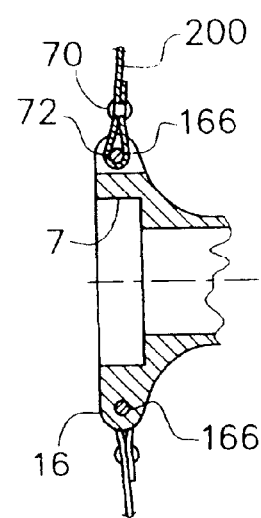
FIG. 8e is a cross section view of the hub shell, as seen generally along lines 25—25 of FIG. 8d, including the spokes and an intermediate connecting member.

FIG. 8d and FIG. 8e describe an embodiment where an encapsulated intermediate connecting member 166 includes exposed regions 72 that are not encapsulated by the hub flange 16. These exposed regions 72 create sites where the spoke 2 may be attached directly to the intermediate connecting member 166. In the embodiment illustrated in FIGS. 8d and 8e, the spoke 200 is wrapped around the exposed region 72 and fastened to itself by a rivet 70, thus affixing the spoke 200 to the intermediate connecting member 166. Also shown is a bearing bore 7 molded within the hub flange 16 to accept the bearing 11 of FIG. 3a.

Figure 8F:
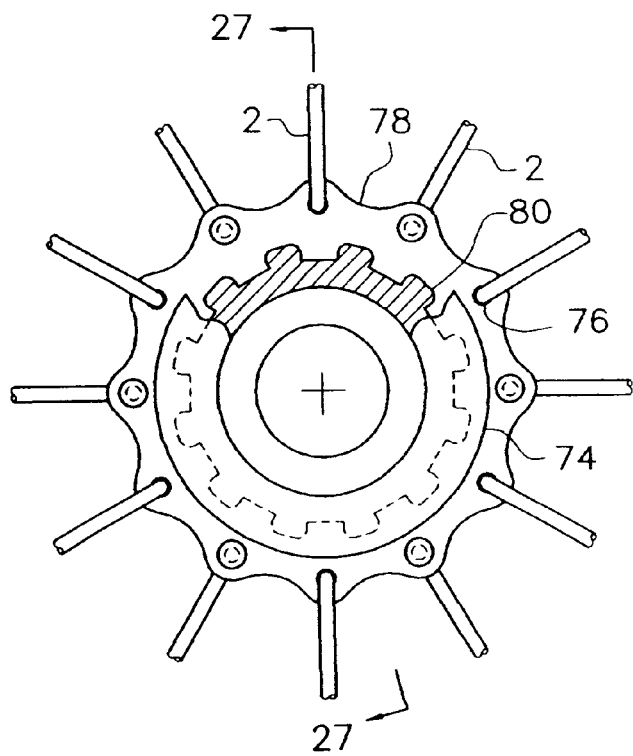
FIG. 8f is an axial plan view of the hub flange region, including a partial cross-section of the intermediate hub flange that schematically illustrates an alternative embodiment of the present invention, detailing the connection of spokes and the hub flange and including an intermediate hub flange.
Figure 8G:
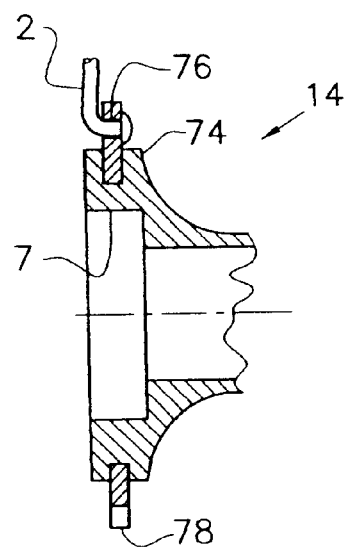
FIG. 8g is a partial cross section of the hub shell, as seen generally along lines 27—27 of FIG. 8f, including an intermediate hub flange, a hub flange and the spokes.
Figure 8H:
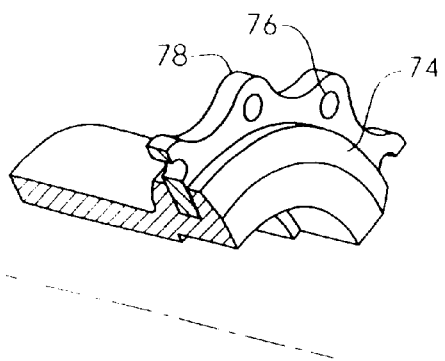
FIG. 8h is a partial cross-section of the hub shell of FIG. 8f in perspective view, including an intermediate hub flange and a hub flange.

FIGS. 8f, 8g and 8h describe another embodiment that includes a hub flange connecting member 78 as a separate component that is preformed, preferably out of aluminum. An intermediate hub flange 74 is then molded to surround a portion of the hub flange connecting member 78, thereby locking these two components together as illustrated to form a composite hub flange. The hub flange connecting member 78 shown here has a continuous exposed region around its periphery which includes axial holes 76 which are adapted to receive conventional spokes 2 in a manner similar to that described in FIG. 2c and as shown in FIG. 8g. Thus the hub flange connecting member 78 also functions as an intermediate connecting member 166 of FIGS. 8d and 8e to which the spokes 2 are joined, effectively distributing the spoke tension forces to the other spokes 2 of the hub flange connecting member 78 and reducing the forces that are transmitted to the intermediate hub flange 74. The hub flange connecting member 78 also includes notches 80 within its inside diameter to provide mechanical interlock when encapsulated by the intermediate hub flange 74 material.

The hub flange connecting member 78 shown here includes a non-circular outer perimeter where the member 78 is built up around the spoke holes 76 to provide greater strength to the connection. Conversely, the member 78 is relieved in the region between the connection points to save material and weight. A similar effect of localized reinforcement may be achieved by increasing the axial thickness of the hub flange connecting member 78 in the region surrounding the spoke 2. These principles of a noncircular hub flange 16 or a hub flange which otherwise includes a raised surface adjacent the spoke 2, may be applied to most, if not at all, of the embodiments described herein.

Figure 8I:
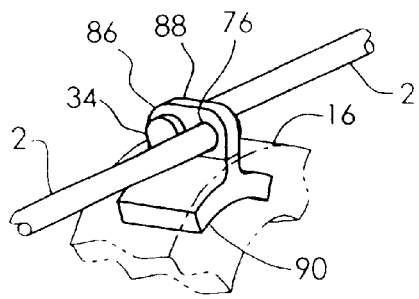
FIG. 8i is a partial perspective view of the hub flange region schematically illustrating an alternate embodiment of the present invention that details the connection of the spokes with the hub flange, including a spoke mount insert.

FIG. 8i describes an embodiment where the hub flange 16 includes a multiple of individual spoke mount inserts 86 which are partially encapsulated by the hub flange 16 material. The spoke mount insert 86 includes a base portion 90 which is encapsulated by the hub flange 16 material to provide a mechanical interlock engagement with the solidified hub flange 16. The spoke mount insert 86 also includes a spoke tab 88 portion that is exposed outside of the hub flange 16 and includes holes 76 for mounting of the spokes 2. Although the spoke tab 88 may be adapted to mount any number of spokes 2, this figure shows two spokes 2, each extending in opposite directions, resulting in a spoke lacing arrangement known in industry.

Figure 9:
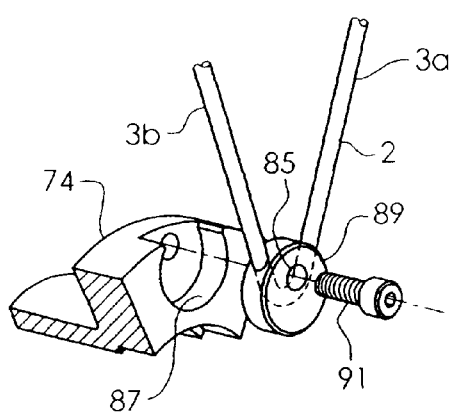
FIG. 9 is a partial perspective exploded view of the hub flange region, schematically illustrating an alternate embodiment of the present invention, including the connection of a spoke with a partial hub flange and the assembly of the partial hub flange with an intermediate hub flange.

The encapsulating hub flange 16 need not be a continuous circumferential element that surrounds the axle 9. As described in FIG. 9, the spoke 2 is encapsulated by a partial hub flange 89 which serves as an attachment element for affixing the spoke 2 to an intermediate hub flange 74. In this case, the partial hub flange 89 encapsulates a duplex spoke 2 which includes two structural portions, 3a and 3b, that span between the hub shell 14 and the rim 8. The external surface of the partial hub flange 89 is located to engage with the pocket 87 in the intermediate hub flange 74. If desired, the intermediate hub flange 74 may be molded to encapsulate partial hub flange 89. A screw 91 passes through a hole 85 in the partial hub flange 89, anchoring it to the intermediate hub flange 74.

Another series of embodiments are based on a preformed hub flange 16 where the hub flange 16 includes a cavity 108 to accept the spoke 2. While the spoke 2 is located within the cavity 108, liquefied encapsulating material 110 is flowed into the cavity 108, to circumfuse the encapsulated portion 18 of the spoke 2. Thus, when the encapsulating material 110 is solidified, the spoke 2 is anchored to the hub flange 16. With this series of embodiments, the cavity 108 of the preformed hub flange 16 acts as the mold for casting the encapsulating material 110.

Figure 10A:
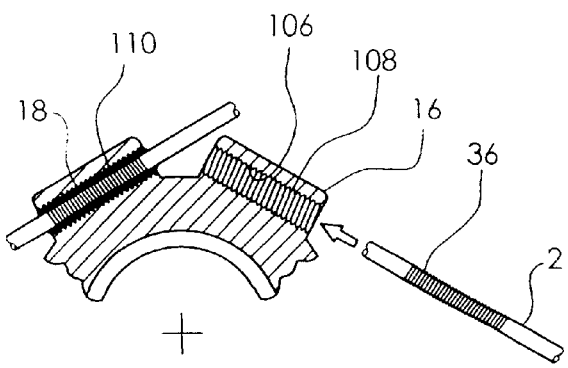
FIG. 10a is a partial cross-section view of the hub flange, shown in axial plan view and schematically illustrating an alternate embodiment of the present invention that includes a cylindrical encapsulating connection between the hub flange and the spokes.

This arrangement is well illustrated in FIG. 10a where the hub flange 16 includes open cavities 108 through which the spoke 2 is assembled. When the spoke 2 is located within the open cavity 108, liquefied encapsulating material 110 is flowed to fill the clearance between the spoke 2 and the open cavity 108. When the encapsulating material 110 solidifies, the spoke 2 is firmly anchored within the open cavity 108 of the hub flange 16. Further, to provide a mechanical interlock with the encapsulating material 110, the inside surface of the open cavity 108 includes a knurled or threaded portion 106 and the external surface of the spoke 2 includes a knurled or threaded portion 36. It should be noted that the threaded portion 106 of the open cavity 108 and the knurled portion 36 of the spoke 2 may have clearance and do not necessarily interlock with each other, but instead they may be coupled to each other via the encapsulating material 110 as shown.

The spoke 2 in this figure is a duplex spoke 2 which is aligned to have a straight path through the encapsulated portion 18 and extending at both ends out to the rim 8. This "straight through" spoke alignment eliminates the possibility for any distortion of the spoke 2 within the encapsulated region 18.

Figure 10B:
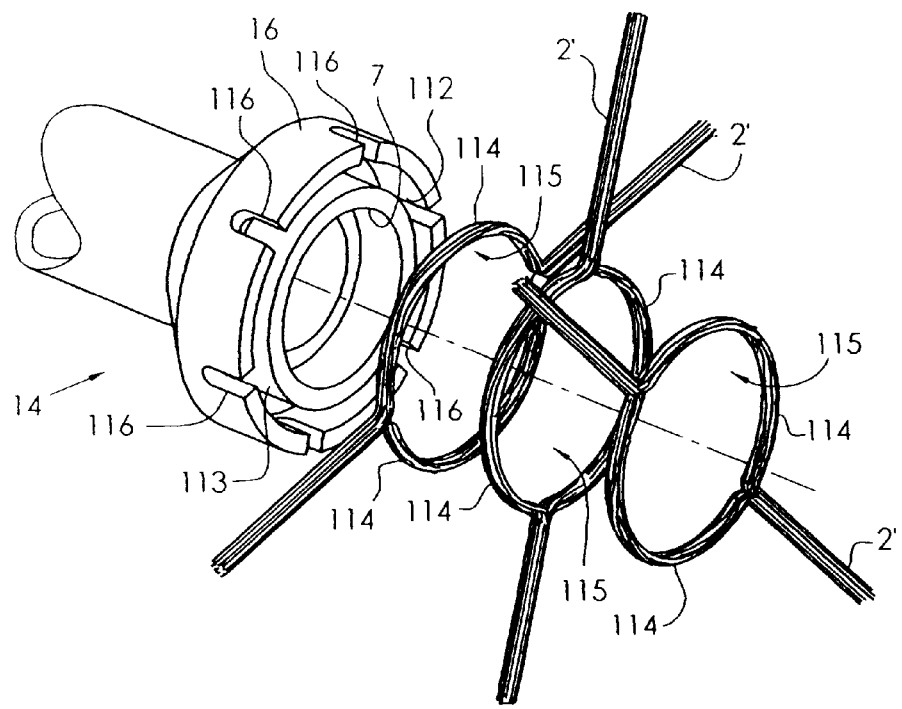
FIG. 10b is a partial perspective exploded view of an alternate embodiment of the present invention, schematically illustrating the assembly of the spokes prior to their encapsulated connection within a channel in the hub flange and including an opening in the spokes that circumferentially surrounds the axle bore.

FIG. 10b describes an embodiment where the hub flange 16 includes an axially extending cylindrical channel 112 formed therein to accept the spokes 2'. The spokes 2' are of multi-filament construction and the fiber bundle is split into two smaller bundles 114 in the region of the channel 112, creating an opening 115 to circumferentially surround the bearing bore 7. The spoke 2' is located within the channel so that the smaller bundles 114 straddle the collar 113 that is created by the inside diameter of the cylindrical channel 112. In this figure, the collar 113 is generally concentric with the bearing bore 7 of the hub shell 14. The outside diameter of the axial channel 112 includes openings 116 to allow the spoke 2' to pass through and exit the hub flange 16, extending toward the rim 8. With the desired number of spokes 2' fitted within the channel 112, liquefied encapsulating material 110 is flowed to fill the channel 112 and encapsulate the spokes 2'. Thus, when the encapsulating material 110 solidifies, the spokes 2' are cast within the channel 112 and are locked to the hub flange 16.

Figure 10C:
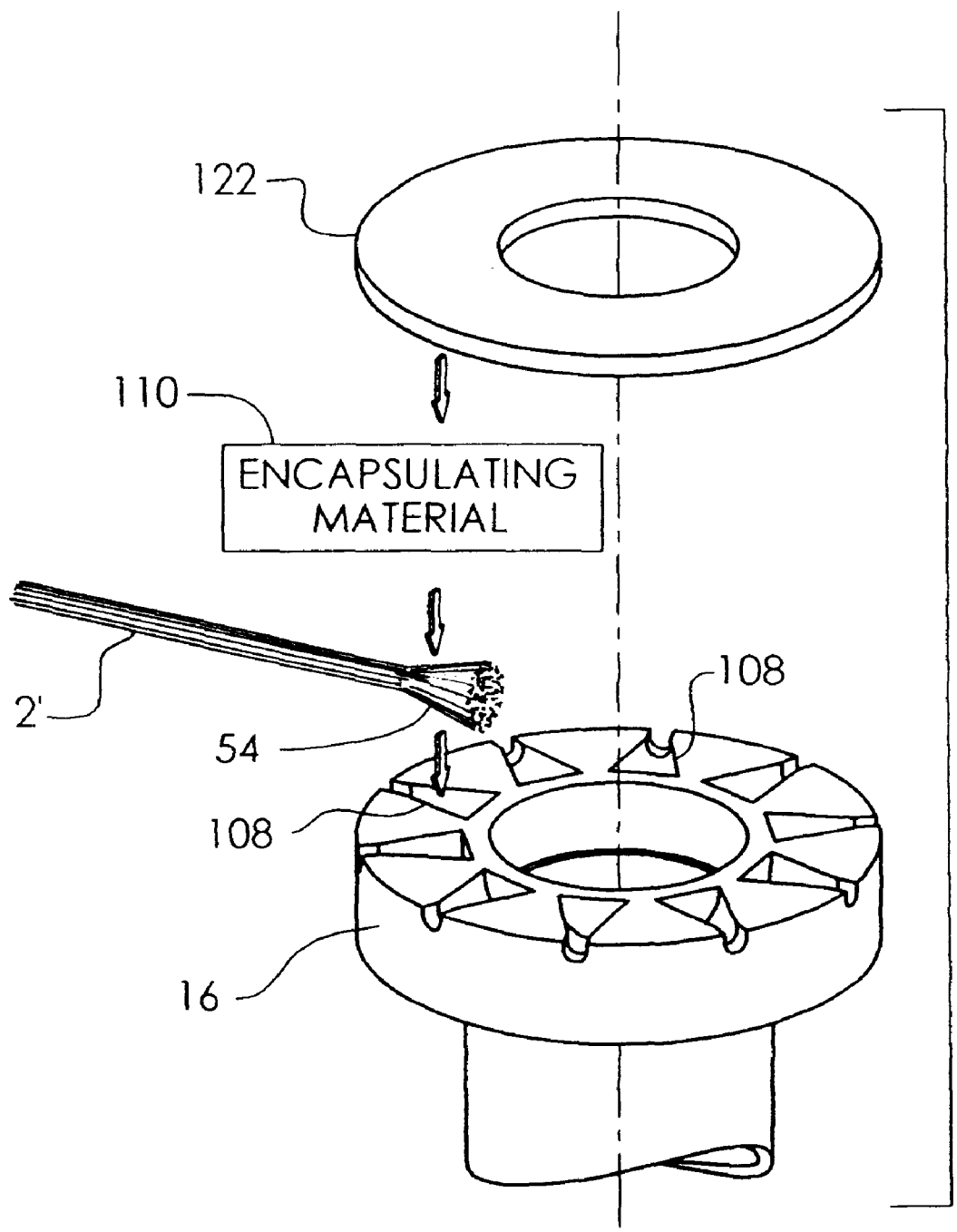
FIG. 10c is a partial perspective exploded view of an alternate embodiment of the present invention, illustrating the assembly of the spokes prior to their encapsulated connection with the hub flange and including a cavity in the hub flange to receive the spoke and a cover to enclose the cavity.

An embodiment where individual pockets or cavities 108 are formed within the hub flange 16 is described in FIG. 10c. These cavities 108 are each shaped to accept the splayed end 54 of a spoke 2' of multi-filament construction. When the splayed end 54 of the spoke 2' is placed within the cavity 108, liquefied encapsulating material 110 is flowed to fill the cavity 108 to encapsulate the individual filaments. Thus, when the encapsulating material 110 solidifies, a solid slug of encapsulating material 110 is cast within the cavity 108 to include the spoke ends 54 that are now solidly anchored to the hub flange 16. The cavity 108 may be designed such that its shape and contour will create a solidified slug of encapsulating material 110 that is mechanically locked within the cavity 108 itself for greater resistance to spoke 2' pull-out. The cavities 108 shown in FIG. 10c, for example, are of a reverse tapering conical shape so that the slug of encapsulating material 110 will wedge within the cavity 108 upon application of spoke tension. During or subsequent to the casting process, a spoke cover 122 may be placed over the cavities 108 of the hub flange 16 to enclose the cavities 108 more fully and create a more complete surround to contain the encapsulating material 110 within the cavity. Further, if the spoke cover 122 is fixed to the hub flange 16, it may serve to block the cavity 108 opening, serving to retain the encapsulating material 110 and the associated spoke 2' within the cavity. This embodiment is merely representative of many possible configurations where spokes 2' are connected to a single hub flange 16 through an encapsulating process. For example, instead of fitting the spoke 2' to the cavity 108 in an axial direction as shown, the spoke 2' may be fitted to the cavity 108 through an opening that extends in a generally radial direction. In this case, the hub flange 16 would include a series of radially extending cavities 108 and the spoke 2' would be fitted within the cavity through the radial cavity 108 while a liquefied encapsulating material 110 is flowed therein to capture the spoke 2' upon solidification.

Figure 10D:
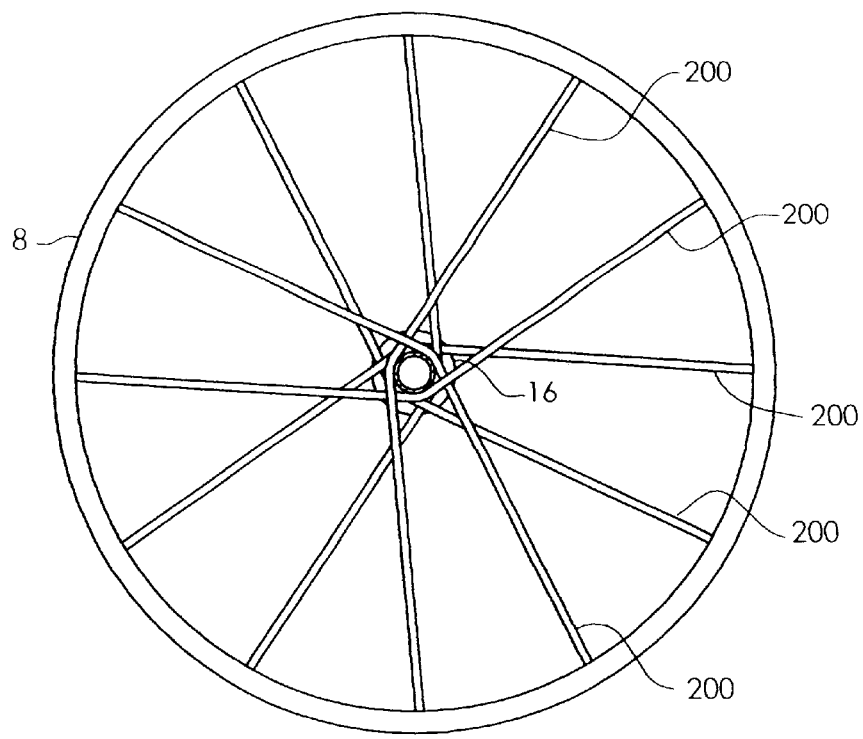
FIG. 10d is an axial plan view of an alternate embodiment of the present invention, schematically illustrating a hub flange that includes a radially extending channel and spokes located therein, with outer portion of the flange shown removed to illustrate the path of the spokes.
Figure 10E:
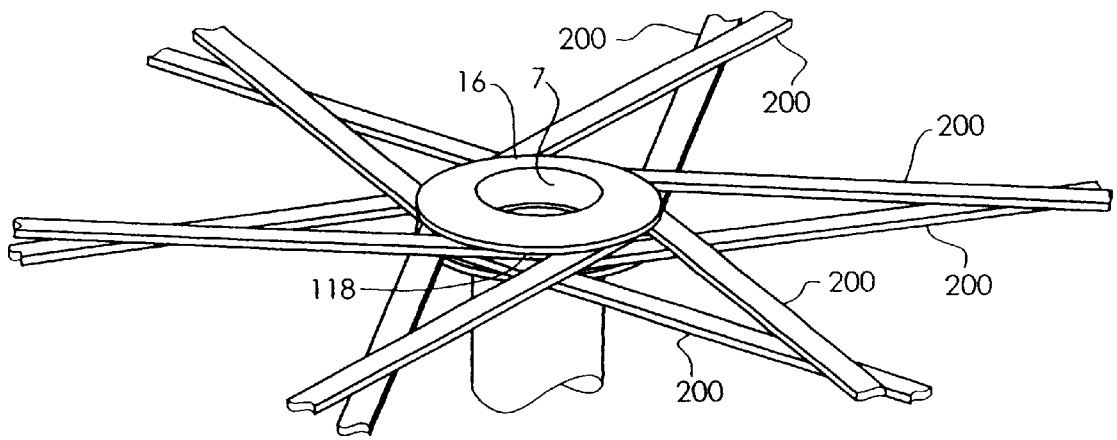
FIG. 10e is a partial perspective view of the embodiment of FIG. 10d, further detailing the fitment of the spokes with the radial channel of the hub flange.

While FIG. 10b describes a hub flange 16 with an axially extending cylindrical channel 112, FIGS. 10d and 10e describe an embodiment where the hub flange 16 includes a radially extending channel 118. The spokes 200 are of relatively flat cross-section and once they are located in the desired position within the radial channel 118, liquefied encapsulating material 110 is flowed within the channel 118. Thus, when the encapsulating material 110 solidifies, the spokes are cast within the channel 118 and are locked to the hub flange 16. It is also envisioned that individual slots or partial channels or cavities, corresponding to individual spokes 200, may be substituted for the continuous channel 118 shown in this figure. FIGS. 10d and 10e describe the spokes 200 as being relatively straight as it passes through the channel 118, however it is anticipated that the spoke 200 may also be bent to circumferentially wrap around the channel 118 by a prescribed amount, thus increasing the length of contact between the spoke 200 and the channel 118. Although simply bonding the spokes 2 within the channel 118 may create an adequate connection, it is more desirable to flow encapsulating material to fill the radially extending channel 118 and fully encapsulate the spokes as in previous embodiments, creating a solid and reliable connection.

While many of the previous figures have described embodiments where the entire hub flange 16 is molded or cast to surround the spoke 2 or 2' or 200, it is possible to liquefy or soften only a small localized region of the hub flange 16 material directly surrounding the component to be encapsulated. Upon resolidification, this component is captured by the hub flange 16 material. One well known process for achieving such localized melting is referred to as ultrasonic welding whereby mechanical energy is transferred to the hub flange 16 material via the component to be encapsulated. The mechanical energy creates heat at the interface where the two parts contact, thus melting a region directly surrounding the encapsulated component. Ultrasonic welding is especially suited to melt thermoplastic polymers although the process has been applied to metals as well. Other techniques such as spin welding and vibration welding, among others, are viable processes that also rely on mechanical energy to produce localized melting and joining. While the application of mechanical energy is particularly suited to provide the localized melting required for assembly as described, it is also anticipated that the hub flange 16 material may be melted through the direct application of heat or energy from a focused source such as a laser or electron beam.

Figure 11A:
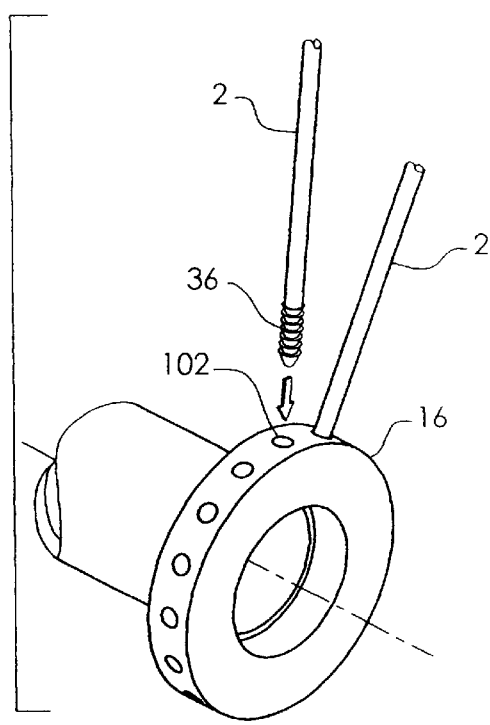
FIG. 11a is a partial perspective exploded view of an alternate embodiment of the present invention, schematically illustrating the assembly of the spokes to the hub flange prior to joining these components through the localized melting of the hub flange material.
Figure 11B:
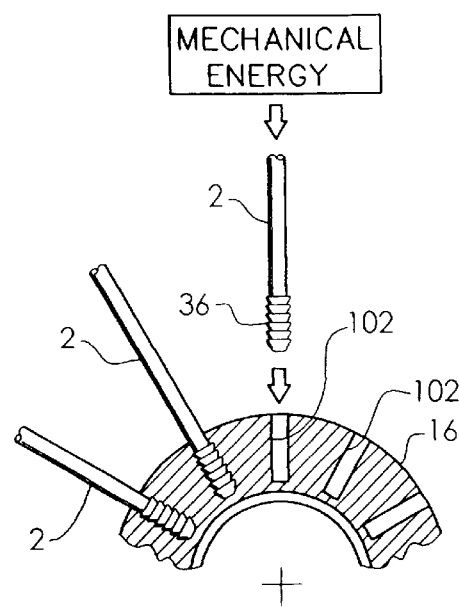
FIG. 11b is a partial cross-section view of the hub flange in axial plan view, illustrating the embodiment of FIG. 11a and detailing the assembled connection of spokes and the hub flange.

An example where mechanical energy is transmitted through a spoke 2 to produce localized melting in the adjacent hub flange 16 material is described in FIGS. 11a–b. Mechanical energy is imparted to the spoke 2, preferably in the form of ultrasonic vibration such that, when the spoke 2 is brought into contact with the hub flange 16, the mechanical energy produces heat to locally melt the hub flange 16 material. The spoke 2 includes a knurled portion 36 in the region that will engage with the hub flange 16. To minimize the amount of material that needs to be displaced, it is preferable that the hub flange 16 includes holes 102 to accept the spoke 2. The hole 102 should be of smaller diameter than the knurled portion 36 of the spoke 2 so that the two surfaces will contact, causing melting of the hub flange 16 material surrounding the spoke 2 as the spoke 2 is driven into the hole 102. As the hub flange material 16 melts, it flows to follow the contour of the knurled portion 36, thus creating a mechanical interlock connection between the spoke 2 and hub flange 16 upon cooling and solidification of the melted material. This joining process may be duplicated to create a direct encapsulated connection between a single hub flange 16 and a multiplicity of spokes 2.

It is also envisioned that mechanical energy may be directed first through the hub flange 16 to effect melting of the hub flange 16 material. For example, an energized ultrasonic welding horn may be fixtured to bear against the hub flange 16, driving the hub flange 16 into contact with the spoke 2, melting the hub flange 16 material and creating an encapsulated engagement with the spoke 2.

While the input of mechanical energy is effective in joining the spoke 2 to the hub flange 16, the hub flange 16 may also be locally melted through the direct application of thermal energy or heat. One such method of joining involves heating of the spoke 2 prior to assembly. As the heated spoke 2 is brought into contact with the hub flange 16, heat is transferred to the hub flange 16, causing localized melting or softening of the hub flange 16 material. The softened hub flange 16 material conforms to encapsulate the end of the spoke 2 so that, upon cooling and solidification, a firm connection between the two components is achieved.

Figure 11C:
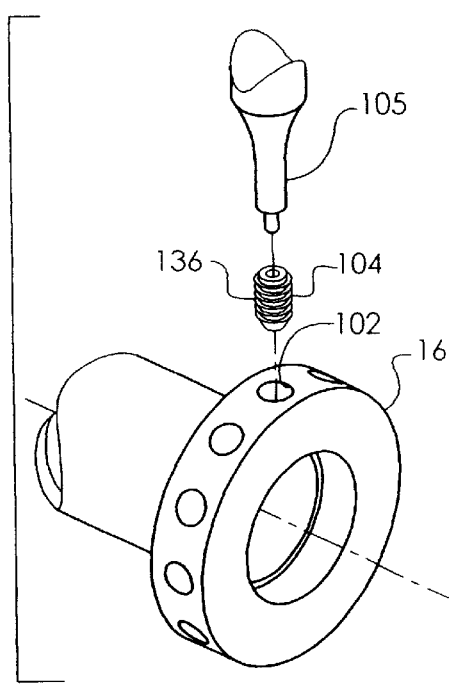
FIG. 11c is a partial perspective exploded view of an alternate embodiment of the present invention, schematically illustrating the assembly of the spokes to the hub flange, including an intermediate insert joined to the hub flange and an ultrasonic welding horn to facilitate joining of the insert to the hub flange.
Figure 11D:
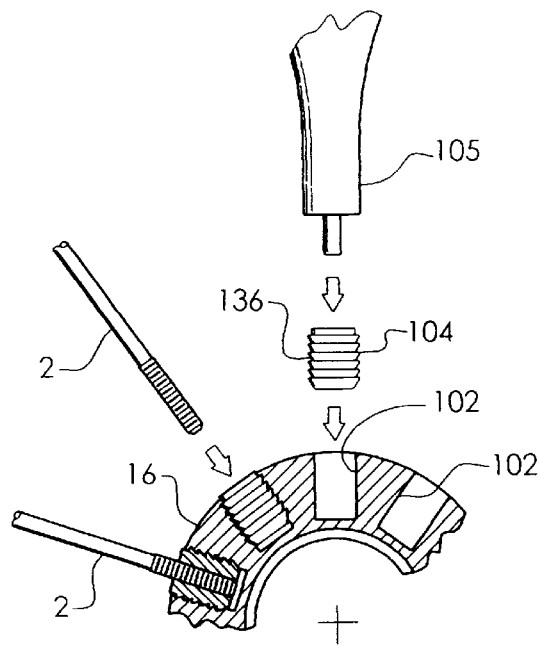
FIG. 11d is a partial cross-section view of the hub flange in axial plan view, illustrating the embodiment of FIG. 11c and detailing the assembled connection of spokes, the insert and the hub flange.

FIG. 11c and FIG. 11d describe an embodiment where individual inserts 104 are joined to the hub flange 16 via mechanical energy in a manner similar to that described in FIGS. 11a and 11b. Thus, the insert 104 preferably includes a knurled portion 136 and the hub flange 16 preferably includes undersized holes 102 to accept the insert 104. As the insert 104 is brought into contact with the hole 102 in the hub flange 16, mechanical energy is transmitted through the insert 104 to the hub flange 16 material via an ultrasonic welding horn 105. The mechanical energy causes localized melting of the hub flange 16 material, allowing the insert 104 to fit within the hole 102 of the hub flange 16 material, resulting in a firm connection between the insert 104 and the hub flange 16 upon resolidification of the melted material. The spoke 2 may then be affixed to the intermediate insert 104 to create a firm connection with the hub flange 16. In this figure, the spoke 2 is threadably fastened to the insert 104 as shown.

Thus, the present invention provides a vehicle wheel that is inexpensive to produce, lends itself easily to high-volume manufacturing methods, is light in weight and is strong and reliable. Further, the present invention reduces the amount of labor required to assemble the wheel. Further still, the present invention reduces component cost through the use of lower-cost materials, by reducing the tolerances and number of forming operations required in spoke manufacture, and by utilizing net-shape hub forming operations to reduce scrap and fabrication expense. Further still, the present invention reduces wheel weight by facilitating the utilization of light weight hub materials, by allowing greater freedom in hub flange detail and geometry to optimize the design, by facilitating the use of multi-filament spokes, and by facilitating hybrid hub shell construction where high-strength materials are used only where necessary. Yet further, the present invention increases the strength and reliability of the wheel by reducing stresses in components and connections, by eliminating any clearances or relative movement between the hub and spokes, by eliminating any unsupported bends in the spokes.

While the above description contains many specificities, these should not be construed as limitations on the scope of the invention, but rather as exemplifications of embodiments thereof. Many other variations are possible. It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A wheel, comprising:

a peripheral wheel rim;

a central wheel hub with an outer flange;

a plurality of spokes extending between the rim and hub, wherein said spokes have a first portion connected to said rim and a second portion opposed to said first portion;

at least a portion of said hub formed from a hardened molding material, wherein said hardened molding material has a non-hardened, conformable state and a subsequent hardened state; and with at least a portion of the second portion of at least one spoke secured to said hub by an encapsulated connection to secure the second portion of said at least one spoke and said hardened molding material by the hardening of said hardened molding material from the non-hardened, conformable state to the hardened state which in the hardened state is integral with the hub and conforms thereto, wherein said wheel is a tension spoke connected to said spokes to create spoke pretension upon hardening of said molding material.

2. A wheel according to claim 1, wherein the hardened molding material is liquified material which is solidified.

3. A wheel according to claim 1, wherein said spokes are secured to said outer flange.

4. A wheel according to claim 3, wherein said hardened molding material forms at least a portion of said flange.

5. A wheel according to claim 3, including a plurality of said spokes secured to said outer flange by said hardened molding material.

6. A wheel according to claim 3, wherein said hardened molding material encapsulates said at least one spoke over at least a portion of its length.

7. A wheel according to claim 3, including a substantially straight span of said spoke in the exposed region between the hub flange and rim.

8. A wheel according to claim 7, wherein said substantially straight span of said spoke extends colinearly into at least a portion of the encapsulated region.

9. A wheel according to claim 3, including a joining interface between the hardened molding material and said spoke.

10. A wheel according to claim 3, including at least two of said flanges, with each spoke secured to one of said flanges.

11. A wheel according to claim 3, wherein said hardened molding material is adhered to said hub.

12. A wheel according to claim 3, wherein the hardened molding material surrounds at least a portion of the second portion of said spoke.

13. A wheel according to claim 12, wherein said spoke includes a bent region thereof which is secured in said hardened molding material, with a spoke span extending from the bent region to said rim.

14. A wheel according to claim 13, wherein the hardened molding material surrounds the bent region of said spoke and wherein the spoke span is integral with the bent region.

15. A wheel according to claim 3, wherein said hardened molding material is a polymeric material.

16. A wheel according to claim 3, wherein the hardened molding material encapsulates and surrounds the entire cross section of said spoke.

17. A wheel according to claim 3, including a configured portion of the hub flange which engages said encapsulating material.

18. A wheel according to claim 3, including reinforcing material within the hardened molding material.

19. A wheel according to claim 18, wherein said reinforcing material includes a spoke locating support.

20. A wheel according to claim 19, wherein said reinforcing material is a circumferential member.

21. A wheel according to claim 3, including an opening in the encapsulating material formed by a spoke locating support.

22. A wheel according to claim 3, including a bent region of said second portion at least in part encapsulated in said hardened molding material.

23. A wheel according to claim 22, wherein said bent region includes at least two bends.

24. A wheel according to claim 3, including a configured portion of variable cross section of said second portion encapsulated in said hardened molding material.

25. A wheel according to claim 24, wherein said configured portion is knurled.

26. A wheel according to claim 24, wherein said configured portion is an enlarged portion.

27. A wheel according to claim 3, including interconnected second portions of at least two spokes at least in part encapsulated in said hardened molding material.

28. A wheel according to claim 3, wherein a spoke span extends from the encapsulated connection in an oblique direction.

29. A wheel according to claim 3, wherein said spoke is essentially round in cross section.

30. A wheel according to claim 3, wherein said spoke is essentially flat in cross section.

31. A wheel according to claim 30, including a notch portion of said second portion encapsulated in said hardened molding material.

32. A wheel according to claim 30, including at least one extended tab of said second portion encapsulated in said hardened molding material.

33. A wheel according to claim 30, including at least one through opening in said second portion encapsulated in said hardened molding material.

34. A wheel according to claim 30, including at least one twisted portion of said second portion encapsulated in said hardened molding material.

35. A wheel according to claim 30, including at least one folded portion of said second portion encapsulated in said hardened molding material.

36. A wheel according to claim 3, including at least three spokes connected at a common end at said second portion, wherein said common end is encapsulated in said hardened molding material.

37. A wheel according to claim 3, wherein said spoke is at least partially wrapped around said hub and at least partially circumscribes said hub.

38. A wheel according to claim 3, wherein said spoke is a multi-filament spoke constructed from a bundle of filaments.

39. A wheel according to claim 38, wherein said second portion of said multi-filament spoke encapsulated by said hardened molding material is spread to expose at least a portion of the outer surfaces of the filaments and to bond said hardened molding material to individual filaments.

40. A wheel according to claim 38, wherein said second portion of said multi-filament spoke encapsulated by said hardened molding material is spread apart by at least one solid element.

41. A wheel according to claim 38, wherein said multi-filament spoke is under tension provided by aligning the filaments in tension during the molding procedure.

42. A wheel according to claim 41, including at least one solid member at least in part encapsulated by said hardened molding material, wherein said second portion is stretched over said solid member.

43. A wheel according to claim 38, inculding an enlarged portion of said filaments encapsulated by said hardened molding material.

44. A wheel according to claim 43, wherein said enlarged portion is a knotted region.

45. A wheel according to claim 3, including an additional member at least in part within said hardened molding material contacting said at least one spoke to at least in part distribute spoke loads over said hardened molding material.

46. A wheel according to claim 3, including a circumferential reinforcement element supporting said hardened molding material.

47. A wheel according to claim 1, including at least one connecting member which is at least in part encapsulated in said hardened molding material, with said at least one spoke engaging said connecting member.

48. A wheel according to claim 47, wherein said connecting member includes a portion thereof which extends from said hardened molding material, and wherein said spoke engages said extending portion.

49. A wheel according to claim 47, wherein said connecting member includes a base portion encapsulated by said hardened molding material and a tab portion extending from said hardened molding material, and including means in said tab portion for connection to at least one spoke.

50. A wheel according to claim 3, wherein said flange includes a first flange portion of hardened molding material with the second portion of said spoke encapsulated therein, and a second flange portion, with the first flange portion connected to the second flange portion.

51. A wheel according to claim 50, wherein said first flange portion includes at least one cavity, with said second portion of at least one spoke extending into said cavity and encapsulating therein by said hardened molding material.

52. A wheel according to claim 51, wherein said cavity includes an axially extending channel.

53. A wheel according to claim 51, including a plurality of said cavities with at least one spoke in each cavity, wherein said spokes are multi-filament spokes constructed from a bundle of generally parallel filaments.

54. A wheel according to claim 51, wherein said cavity has a shape to prevent pullout and to lock said hardened molding material in said cavities.

55. A wheel according to claim 51, including a spoke cover over said crystal.

56. A wheel according to claim 54, wherein said cavity is a radially extending channel.

57. A wheel according to claim 1, wherein said hardened molding material is formed by malting and resolidifying a localized region of said flange.

58. A wheel according to claim 57, including at least one insert encapsulated within said localized region, with at least one spoke connected to said insert.

59. A wheel according to claim 3, wherein hub flange material includes reinforcement fibers distributed within said hardened molding material.

60. A wheel according to claim 50, including at least one insert in said first flange portion with said at least one spoke connected to said insert.

61. A wheel according to claim 3, wherein said outer flange includes a raised surface adjacent said spoke for localized strengthening of the connection with said spoke.

62. A wheel according to claim 3, wherein said hardened molding material is formed within a mold, with said mold including at least one mold half and a parting line surface, and wherein said at least one spoke extends within said parting line surface.

63. A wheel according to claim 3, wherein said spoke is placed under pretension during the molding process to accurately locate the spoke within said encapsulating material.

64. A wheel according to claim 3, wherein a spoke span extends from the encapsulated connection in a generally radial direction.

65. A wheel according to claim 3, including: a first hub flange which includes a first portion of said hardened molding material with said second portion of said at least one spoke secured thereto; and a second hub flange which includes and second portion of said hardened molding material with said second portion of at least one other spoke secured thereto; wherein said first hub flange is connected to said second hub flange.

66. A wheel according to claim 65, wherein said first hub flange is axially spaced from said second hub flange.

67. A wheel according to claim 3, wherein at least a portion of said second portion of said spoke is orientated to provide hoop strength reinforcement to said hub flange.

68. A wheel according to claim 1, wherein said spoke is essentially straight over its length, including said first portion and second portion thereof.

69. A wheel according to claim 1, wherein the second portion of said spoke is adhered to said hardened molding material.

70. A wheel according to claim 3, including a multiplicity of said spokes, wherein said second portions of each of said spokes are connected to the second portions of at least two other of said spokes within said hardened molding material to create a circumferential ring of connected second portions of said spokes.

71. A wheel according to claim 47, wherein said connecting member is an annular circumferential element.

72. A wheel according to claim 3, wherein said hardened molding material is a continuous circumferential annular element defining a hub flange and wherein the external surface of said annular element is formed in a mold.

73. A wheel according to claim 3, including a circumferential outer perimeter of said hub flange, wherein said outer perimeter includes raised portions adjacent said spokes and relieved portions between said raised portions.

74. A wheel according to claim 62, including at least two mold halves, wherein at least two of said mold halves are assembled in a generally axial direction to create a molding cavity.

75. A wheel according to claim 1, wherein said hardened molding material is formed via a molding process selected from the group consisting of injection molding and die casting.

76. A wheel according to claim 1, wherein said spoke is integrally fixed to said hardened molding material.

77. A wheel according to claim 1, including a contiguous connecting interface between said hardened molding material and rim and said rim and hub.

78. A wheel according to claim 1, wherein a portion of said spoke is insert molded within said hardened molding material.

79. A wheel according to claim 3, where said hardened molding material includes a first hub flange with said second portion of said at least one spoke secured thereto; and a second hub flange with said second portion of at least one other spoke secured thereto.

80. A wheel according to claim 1, wherein the hardened molding material conforms to the shape of a preformed element.

81. A wheel according to claim 80, wherein the preformed element is an insert and said spoke is attached to said insert.

82. A wheel according to claim 3, wherein said wheel includes an axle bearing, and wherein said hub includes a bearing bore to carry said axle bearing, and wherein a surface of said hardened material includes at least a portion of said bearing bore.

83. A wheel, comprising:

a peripheral wheel rim;

a central wheel hub with an outer flange;

a plurality of spokes extending between the rim and hub, wherein said spokes have a first portion connected to said rim and a second portion opposed to said first portion, wherein said spokes are secured to said outer flange;

at least a portion of said hub formed from a hardened molding material, wherein said hardened molding material has a non-hardened, conformable state and a subsequent hardened state; and with at least a portion of at least one spoke secured to said hub by an encapsulated connection to secure the second portion of said at least one spoke and said hardened molding material by the hardening of said hardened molding material from the non-hardened, comformable state to the hardened state which in the hardened state is integral with the hub and conforms thereto, wherein said wheel is a tension spoke wheel and wherein said spoke is pretensioned, and wherein at least one of said spokes is a continuous element including at least two structural spans between the rim and hub and a common portion encapsulating at the hub.

84. A wheel according to claim 4, wherein said flage is individually molded and removably assembled to said hub.

85. A wheel according to claim 4, including two of said flanges axially spaced on either side of the hub.

86. A wheel according to claim 3, wherein said central wheel hub includes a first outer flange and a second outer flange, wherein said first outer flange and said second outer flange are individually formed and wherein is subsequently assembled to said second outer flange.

87. A wheel according to claim 86, wherein said first outer flange is removably assembled to said second outer flange.

88. A wheel according to claim 1, wherein said spokes carry load only in tension.

* * * * *